United States Patent
Romney et al.

(10) Patent No.: US 9,947,236 B2
(45) Date of Patent: Apr. 17, 2018

(54) APPARATUS, SYSTEM, AND METHOD FOR A VIRTUAL INSTRUCTION CLOUD

(71) Applicants: Gordon W. Romney, Midway, UT (US); Baird W. Brueseke, San Diego, CA (US)

(72) Inventors: Gordon W. Romney, Midway, UT (US); Baird W. Brueseke, San Diego, CA (US)

(73) Assignee: INETWORK, INC., San Diego, CA (US)

( * ) Notice: Subject to any disclaimer, the term of this patent is extended or adjusted under 35 U.S.C. 154(b) by 330 days.

(21) Appl. No.: 13/939,139

(22) Filed: Jul. 10, 2013

(65) Prior Publication Data

US 2014/0017653 A1    Jan. 16, 2014

Related U.S. Application Data

(60) Provisional application No. 61/670,119, filed on Jul. 10, 2012.

(51) Int. Cl.
| | |
|---|---|
| *G09B 7/00* | (2006.01) |
| *G09B 5/00* | (2006.01) |
| *H04L 12/911* | (2013.01) |
| *G09B 7/02* | (2006.01) |
| *G06Q 50/20* | (2012.01) |

(52) U.S. Cl.
CPC .............. *G09B 7/00* (2013.01); *G09B 5/00* (2013.01); *G06Q 50/20* (2013.01); *G09B 7/02* (2013.01); *H04L 47/70* (2013.01)

(58) Field of Classification Search
CPC ... G09B 7/00; G09B 5/00; G09B 7/02; G06Q 50/20; H04L 47/70
USPC ........................................................ 434/350
See application file for complete search history.

(56) References Cited

U.S. PATENT DOCUMENTS

| | | | |
|---|---|---|---|
| 2005/0053905 A1* | 3/2005 | Sadler | 434/309 |
| 2005/0202391 A1* | 9/2005 | Allen | G09B 7/00 434/362 |
| 2006/0036460 A1* | 2/2006 | Gibbons | G06Q 50/205 705/326 |
| 2007/0196807 A1* | 8/2007 | Packard | G09B 7/00 434/350 |
| 2007/0196808 A1* | 8/2007 | Call | 434/350 |
| 2008/0228868 A1* | 9/2008 | Sivakoff | G09B 7/02 709/203 |
| 2008/0254434 A1* | 10/2008 | Calvert | 434/350 |
| 2012/0231438 A1* | 9/2012 | Fakhrai | G09B 7/00 434/350 |

* cited by examiner

*Primary Examiner* — Jack Yip
(74) *Attorney, Agent, or Firm* — Kunzler, PC

(57) ABSTRACT

A system, method, and apparatus for providing educational content via a cloud, include creating a plurality of available educational sessions, the educational sessions comprising a virtual network and being savable by a user for later completion. Saving a session includes saving a state of the virtual network; selecting a subset of the educational sessions, the subset being vetted by an academic instructor, the sessions satisfying requirements for an academic curriculum; recording progress of a student performing the subset of educational sessions; and indicating completion of the academic curriculum in response to the student successfully performing the subset of educational sessions.

14 Claims, 22 Drawing Sheets

APPARATUS, SYSTEM, AND METHOD FOR A VIRTUAL INSTRUCTION CLOUD

CLAIM TO PRIORITY

This application claims priority under 35 U.S.C. § 119(e) to U.S. Provisional Application No. 61/670,119, filed Jul. 10, 2012.

FIELD OF THE INVENTION

This invention relates to virtual instruction and more particularly relates to utilization of virtualized cloud computing technology.

BACKGROUND

Traditionally, educational content may be provided at an academic institution. Academic institutions typically are located at a physical location. Students that may be located at remote locations which may require extensive travel to receive the educational content.

In order to address these physical limitations, academic institutions may provide content digitally. This may allow students in remote locations to receive the educational content, however this also imposes limitations regarding participation in laboratory exercises. Therefore, receiving educational content digitally may not solve present limitations.

In general, providing educational content via a network is gaining widespread acceptance. Although sharing educational content via an Internet server can be done, the educational content is usually static and synchronous in nature. Static text, audio files, video files, or the like, may be transmitted to a student for viewing.

However, providing practical educational content via such a system can be challenging. Computing exercises that require access to several computing devices cannot be readily accomplished via a static information feed. Additionally, reception of a static synchronous feed of education content cannot be easily verified to ensure a student is learning the transmitted material.

SUMMARY OF THE INVENTION

A method is disclosed for a virtual instruction cloud. In one embodiment, the method includes authenticating a user to a network resource, the network resource including one of a network system, a network service, and a virtual network. In another embodiment, the method includes storing a state of the network resource in response to a user disconnecting from the network resource. In a further embodiment, the method includes deleting the network resource after storing the configuration parameters for the network resource. In one embodiment, the method includes reconstructing another network resource, in response the user requesting to connect to the network resource, the another network resource being substantially similar to the deleted network resource.

A method is disclosed for providing educational content in a cloud computing environment comprising creating a plurality of available educational sessions, the educational sessions comprising a virtual network, the educational sessions being savable by a user for later completion, wherein saving a session includes saving a state of the virtual network. In another embodiment, the method includes selecting a subset of the educational sessions, the subset being vetted by an academic instructor, the sessions satisfying requirements for an academic curriculum. In a further embodiment, the method includes recording progress of a student performing the subset of educational sessions. In one embodiment, the method includes indicating completion of the academic curriculum in response to the student successfully performing the subset of educational sessions.

In a further embodiment, the method includes adding educational sessions to the plurality of available educational sessions, and modifying the subset of educational sessions to include at least one of the added educational sessions. In another embodiment, the added educational session includes results from a research project. In one embodiment of the method, the network resource is one of a network system, a network service, a virtual network, a database, a network server, and a router.

A program product comprising a computer readable storage medium storing machine readable code executable by a processor is disclosed. In one embodiment, the operations include creating a plurality of available educational sessions, the educational sessions comprising a virtual network, the educational sessions being savable by a user for later completion, wherein saving a session includes saving a state of the virtual network. In another embodiment, the operations include selecting a subset of the educational sessions, the subset being vetted by an academic instructor, the sessions satisfying requirements for an academic curriculum. In a further embodiment, the operations include recording progress of a student performing the subset of educational sessions. In one embodiment, the operations include indicating completion of the academic curriculum in response to the student successfully performing the subset of educational sessions.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
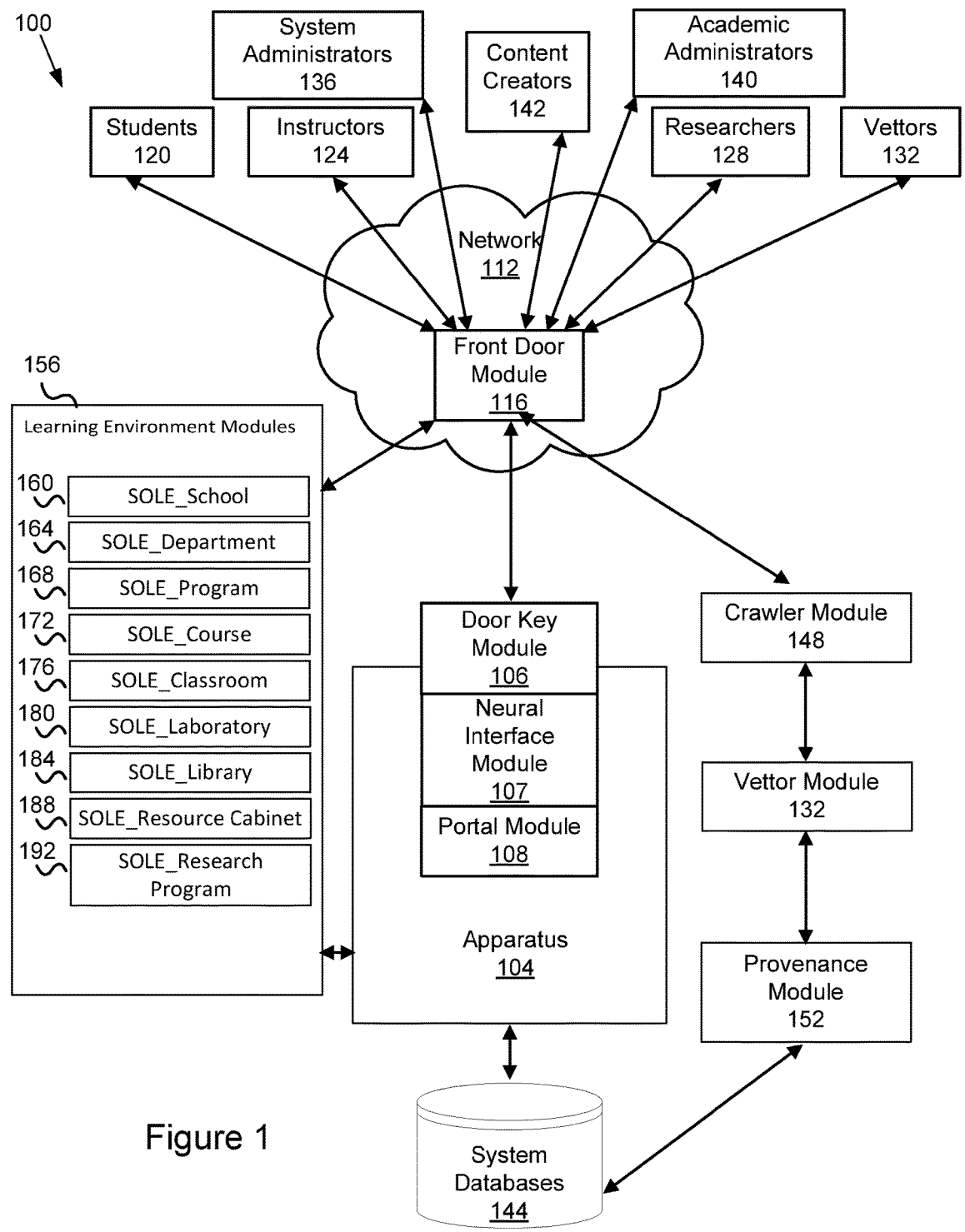
FIG. 1 is a schematic block diagram illustrating one embodiment of an apparatus for providing education content via a network.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a machine readable signal medium or a storage device. The computer readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams, state diagrams, and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code. Descriptions of Figures may refer to elements described in previous Figures, like numbers referring to like elements. In order to address the current state of the art, the present application disclose several embodiments of a method, system, and apparatus for providing educational content via a cloud network.

In one embodiment, educational content may be provided by a Virtual Instruction Cloud (VIC). A VIC, as described herein, may include many systems or servers configured to provide or simulate the various apparatuses, method, or systems described herein. A VIC may be executed on a local network, or on the Internet, or other network, or the like. A VIC may provide services, servers, hosts, routers, other network appliances, or the like. Additional embodiments regarding a VIC will be subsequently described.

In another embodiment, a VIC may include a virtual education laboratory (VEL). A VEL, as described herein, may include a virtual network configured to simulate an educational environment. In one example, a VEL may include several virtual host systems configured to allow a user to perform penetration testing on the host systems. A user may modify the VEL by modifying configuration parameters for one or more of the host systems on the VIC.

In one embodiment, a state of a VEL may be stored or saved. For example, a user may disconnect from the VEL, a system or server may record configuration parameters for the hosts in the VEL. Configuration parameters may include, network addresses, software applications, operating system settings, or other setting of a host on the VEL. In another embodiment, images of the network hosts of the VEL may be stored. Additional embodiments for saving and restoring a session of a VEC are disclosed in following paragraphs.

In one embodiment, a user may, at a later time, request the previously configured VEL. The previously configured VEL may be reconstructed based on the stored configuration parameters, the stored images, or the like.

In one example, a network administrator may create a virtual network to allow students to practice laboratory exercises. In one embodiment, the system of the virtual network may be virtual. In another embodiment, the systems of the virtual network may be physical systems. In one example, the virtual network may be configured to practice penetration testing on a virtual server accessible via the virtual network.

In one example, a professor may construct a virtual network including 50 network appliances or more. For example, the network appliances may include servers, routers, hosts, or the like. In one embodiment, network appliances may be associated with different business entities. For example, 10 appliances may be associated with business A, 10 appliances may be associated with business B, and 10 appliances may be associated with business C. A virtual exercise may include combining the network appliances of the businesses A, B, and C, into one virtual network (the virtual network representing a physical network). Completion of the exercise may include modifying configuration parameters of virtual hosts in the virtual network, reconfiguring network appliances, or the like.

In one embodiment, a student may save the state of the virtual network, and may disconnect from the cloud. In another embodiment, the state of the virtual network may be saved on a server in the cloud. The state of the virtual network may include configuration parameters for virtual hosts in the virtual network, settings of other network appliances, or the like. At a later, or a subsequent time, or session, a student may request the virtual network to be restored. A system may restore the virtual network, based on the stored configuration parameters, or other stored, or saved settings.

In one embodiment, a virtual computer laboratory may be created using similar principles as previously described regarding a virtual network. In one embodiment, the virtual computer laboratory may be executed on one physical system. In another embodiment, virtual hosts may be executed on different physical systems communicating via the virtual network.

In one embodiment, an educational administrator may provide educational content, the educational content including a virtual laboratory exercise. For example, an educational administrator may coordinate a virtual laboratory exercise with other digital media, video, audio, text, images, or the like. Therefore, in one embodiment, an educational administrator, or an instructor may provide a comprehensive presentation of a specific academic concept, and coordinate the academic concept with a practical application of the concept on a virtual network.

For example, an instructor may create a presentation to introduce use of a software application called nmap. Educational content may describe how to use nmap, the purposes of nmap, the capabilities of nmap, or the like. Following a lecture, or similar dissemination of educational content, an instructor may allow access to a computer laboratory, either physically, or virtually, where students may practice use of nmap on various computing systems. This may allow accessing available systems, for practice, without affecting systems designed for other purposes.

In another embodiment, a virtual computer laboratory may be provided as a service. For example, a $3^{rd}$ party service provider may be configured to provide the virtual computer laboratory.

In one embodiment, many educational content topics may be assembled to form a content object. A content object, as described herein, may include a similar or common set of academic principles taught together. For example, a content object may include "penetration testing." In this example, the content object may include, packet sniffing, port scanning, password guessing, vulnerability assessments, or the like.

In one embodiment, many content objects may be assembled to form an instruction set (IS). An instruction set, as described herein, may include many content objects that may be taught together because of technical relevance, academic associations, academic similarity, or the like. For example, an instruction set may include "system security." An instruction set called "system security" may include a content object called "penetration testing." Of course, other names may be used, and this disclosure is not limited in this regard.

In one embodiment, many instruction sets may be assembled to form a course learning outcome. A course learning outcome, as described herein may include many instruction sets taught sequentially, or otherwise, such that a student may learn the instruction sets to accomplish the course learning outcome. Further embodiments regarding a course learning outcome are described in later paragraphs.

In one embodiment, a hierarchy of structural organization of educational topics may include (from leaf to node), content object, instruction set, teaching objective, course learning outcome, course learning objectives, program, or the like. Of course, other names may be used for varying levels of abstraction for describing various levels of granularity from an entire academic program, to a content object, or similar.

In one embodiment, a level of abstraction for a virtual instruction cloud may be configured to substantially replicate an academic accreditation. Therefore, in one embodiment, a specific course for an accredited academic curriculum may be substantially taught via a virtual instruction cloud. In another embodiment, an accredited academic program may be replicated via a virtual instruction cloud.

In one example, an instructor may create many academic modules including lecture materials, laboratory exercises, or the like. In one example, a student may subscribe to a content object out of curiosity. After completing a content object, the student may develop a more serious interest in a specific topic. Therefore, a student may request additional content objects. After completing several content objects, the student may complete an instruction set. After completing several instruction sets, the student may complete a course learning outcome, or similar. Therefore, a student may migrate from academic curiosity to completing an academic curriculum using a combination of physical and virtual instruction sets.

In one embodiment, the virtual instruction cloud may suggest to a student that has done well in a content object, that a diploma may be available by completing related content objects. The related content objects may be configured to satisfy requirements for a diploma or other academic award. A set of content objects may have been vetted to ensure that the set of content objects qualify the student for the academic award. In another embodiment, the vetting may occur at an instruction set level. In another embodiment, the vetting may occur at another abstraction layer, such as, but not limited to, instruction sets, course learning outcomes, course learning objectives, teaching objectives, programs, or the like.

In one embodiment, a set of instruction sets may have been accredited by a $3^{rd}$ party accreditation entity. Therefore, a student who completes the set of instruction sets may transfer credits to another accredited university without penalty. Of course, these teaching methods are not limited to any specific academic subject. Although a computer based, or technical concept has been contemplated, other subject may be similarly taught, such as, but not limited to English, sociology, history, biology, political science, physics, chemistry, mathematics, economics, or the like.

FIG. 1 is a schematic block diagram illustrating one embodiment of a system 100 for providing education content via a network. In one embodiment, the system 100 may include system administrators 136, content creators 142, academic administrators 140, students 120, instructors 124, researchers 128, vettors 132, a network 112, an apparatus 104 that has a front door module 116, a door key module 106, and a neural interface module 107. In another embodiment, the system 100 further includes a portal module 108, a crawler module 148, a provenance module 152, a vettor module 132, system databases 144, and learning environment modules, such as, a systems operations learning environment for a school 160, a systems operations learning environment for a department 164, a systems operations learning environment for a program 168, a systems operations learning environment for a course 172, a systems operations learning environment for a classroom 176, a systems operations learning environment for a laboratory 180, a systems operations learning environment for a library 184, a systems operations learning environment for a resource cabinet 188, a systems operations learning environment for a research program 192.

In one embodiment, system administrators 136 may include individuals with sufficient authority, permission, and capability to alter the configuration of a virtual instruction cloud. In another embodiment content creators 142 may include individuals capable of generating content for inclusion into the virtual instruction cloud. In one embodiment, academic administrators 140 may include individuals designated as managers of an academic program, curriculum, or the like. In another embodiment, students 120 may include any individuals receiving educational content via the virtual instruction cloud. Therefore, students may include teachers, students, researchers, instructors, other individuals, or the like.

In one embodiment, instructors 124 may include individuals with sufficient permission to generate a content object, or similar. In another embodiment, researchers 128 may include individuals perform research for eventual inclusion into the virtual instruction cloud. In one embodiment, a virtual instruction cloud may include vettors 132. Vettors 132 may include individuals with whom instructional content is vetted. In another embodiment, the system 100 may include a network to facilitate communication between various modules of the system 100.

In one embodiment, the network 112 may include a front door module 116. A front door module 116 may provide access to the virtual instruction cloud to users (120, 124, 136, 142, 140, 128, 132). In another embodiment, the system 100 may include a door key module 106. A door key module 106 may authenticate a user (120, 124, 136, 142, 140, 128, 132) in order to allow his or her particular role. In one embodiment, the apparatus 104 may include a neural interface module 107. In another embodiment, the neural interface module 107 may allow a user to physically interface with the apparatus 104. For example, a neural interface module 107 may include a keyboard, a mouse, a touchscreen, a gesture sensor, other mechanical or electrical interface, or the like.

In one embodiment, the network 112 may be a local network. In another embodiment, the network 112 may be the Internet. In another embodiment, the network 112 may include many networks, virtual networks, subnetworks, or the like.

In one embodiment, the system 100 may include a portal module 108. A portal module 108, may provide a user with read access to various portions of the virtual instruction cloud. For example, an instructor may use a portal module 108 to track progress of a student in the virtual instruction cloud. In another embodiment, the system 100 may include a crawler module 148. A crawler module 148 may, in response to a request by a user, discover additional information relative to a specific content object. For example, a crawler module 148 may perform a search on a network, such as the Internet, in order to receive further information relative to a certain content object.

In one embodiment, the system 100 may include a vettor module 132. A vettor module 132 may vet an instruction set and determine that the instruction set is consistent with an accreditation standard. A vettor module may notify an academic administrator 140 if a program fails to be vetted. In another embodiment, the system 100 may include many system databases 144. System databases 144 may include, student databases, instructor databases, content object databases, program databases, accreditation databases, vettor databases, or the like.

Regarding the learning environment modules 160-192, these various modules may or may not be logical consistent with corresponding functions of a traditional brick and mortal academic institution. For example, an SOLE_School module 160 may represent a brick and mortal school, but this is not necessarily the case. Therefore, several modules 160-192 may logical represent physical features of a traditional school.

In one embodiment, the system may be an electronically enabled, Internet accessible, clouds based learning environment for users, students, instructors, researchers, academicians, or the like. A student may select a topical subject to learn about and commence the education process which may lead to an academic degree or industry certification. An instructor may define a course and have it vetted via an accreditation process. A researcher may initiate a project, the results of which become part of a new course of study. The academicians are involved at all levels of the system operation to ensure that the learning environment functions effectively.

In one embodiment, users may access the instruction clouds via the front door module 116. User access may be facilitated via the door key module 106, the neural interface module 107 and the portal module 108. As depicted, the system 100 includes an instruction clouds apparatus 104, system databases 144, a crawler module 148, provenance module 152 tracking of all learning structures, and a learning environment 156.

In one embodiment the learning environment 156 may have schools 160, departments 164, programs 168, courses 172, classrooms 176, labs, libraries 184, resource cabinets 188, and research programs 192. In one embodiment the specific institution may be found in databases 306b. Specific accreditation parameters may be specified in the accreditation database 310a.

Accreditation parameters may apply to all types of institutions specified in the institution databases 306b. In one embodiment universities, colleges and industry certification organizations may be accreditation agents.

In one embodiment the accreditation parameters specified in the accreditation database 310a may be specific institution learning outcomes ILOs, program learning outcomes PLOs and course learning outcomes CLOs. Hence, in one embodiment, an institution may have one set of ILOs, one or more programs, each with its own set of PLOs, each program with one or more courses, and each course with its own set of CLOs. Each course may have more granular learning outcomes that are specified by the instruction clouds system as a teaching objective TO that is part of multiple instruction sets (IS). In one embodiment, there may be one or more teaching objectives to an IS. Each IS may be required to have associated deliverables and rubrics upon which the deliverables are graded.

In one embodiment the system 100 may have elem_structure databases 308 that are comprised of a course learning outcome course learning outcome (CLout) database 308a, that has all of the parameters to define the contents of a course defined by an instructor 124 along with the actual course contents, content objects (Cobjs), stored in a linked structure CLAM database 308b that may include Word documents, Mpeg videos, virtual machine images and so forth.

In one embodiment a student 120, using the Internet 112 is authenticated for access to the front door module 116 by using a door key 106 and neural interface 107 device(s) and may enter the portal 108 gateway to the instruction clouds system 100. One embodiment of the door key 106 is usage of multi-factor authentication submitted through a tablet device that serves as the neural interface 107. In this embodiment the student 120 specifies the unique visual setting that the portal 108 offers for a dual-screen view and selects the desired learning environment 156 for a lab 180 module from courses listed by the courses module 172 referencing the course learning outcome CLout database 308a, and uses the associated CLAM and specific teaching resources supplied by the instructor 124 of the selected course that are contained in the resource cabinet 188 and stored in the student resource cabinet database 316a. Upon completion of an IS specific to the selected CLout, provenance module 152 may record the status of the exercise and completion of teaching objective TO deliverables such as a screenshot of a virtual machine in the an usage database 326h. A record of this accomplishment may be recorded in the student academic plan database 318a.

In another embodiment the student 120 may select the classroom 176 from the learning environment 156 for delivery of a self-taught CLout and instruction set structure from the instruction set database 308d. Upon completion of the instruction set specific to the selected CLout, provenance module 152 may record the status of the exercise and completion of TO deliverables such as a quiz in the provenance completed database 326a. A record of this accomplishment may be recorded in the student academic plan database 318a.

FIG. 1 also shows one embodiment of the manner in which a crawler module 148 daemon may search the Internet 112 for potential content objects to place in a pending crawler identified database 320d. Pending Crawler Databases 320 may be reviewed and vetted by a vettor 132, logged in the provenance vetted database 326e and stored in the Cobj database 308e for use in defining new CLouts by instructors 124 to be used by students 120.

In one embodiment where an object creator 142 was identified as the owner of a specific intellectual property content object, the creator establishes an IP payment rule in the intellectual property rules 322i database. An IP Royalty Payment daemon tracks usage of all content objects and checks the IP rules 322i database and upon determining that IP record(s) are appropriate creates the appropriate records into the IP payment 230e database. Multiple records are possible with one going to the object creator 142 and others to multiple accrediting and vetting institutions where shared venue is the rule model.

In one embodiment, a crawler module 148 may discovery new academic material automatically. For example, a crawler module 148 may determine that a subject is missing from a content object and may recommend to an academic administrator to include missing material. In another example, a crawler module 148 may receive research information from a researcher 128. In another embodiment, a crawler module 148 may discover additional material to be included in a content object. A crawler module 148 may request form a vettor module 150 that the additional materials be vetted, so that an instruction set that includes the content object may be determined to be consistent with a accreditation body.

In another embodiment, a crawler module 148 may report to a provenance module 152 from where additional material was received or discovered. In response to such a report, a provenance module 152 may log a source of the new material. This may allow an academic administrator to further verify the quality or consistency of a content object, instruction set, course learning objective, course learning outcome, or the like. In another embodiment, the provenance module 152 may create a digital fingerprint of a content object, or create digital signatures based on the newly added material. Therefore, a provenance module 152 may provide assurance that educational content delivered via a content object is consistent with educational content that has been vetted by a vettor module 150.

In one embodiment, a systems operations learning environment module SOLE_ResearchProgram 192 may be accessible by students and professors. This may allow students and professors to collaborate in creating additional content objects.

Figure 2A:
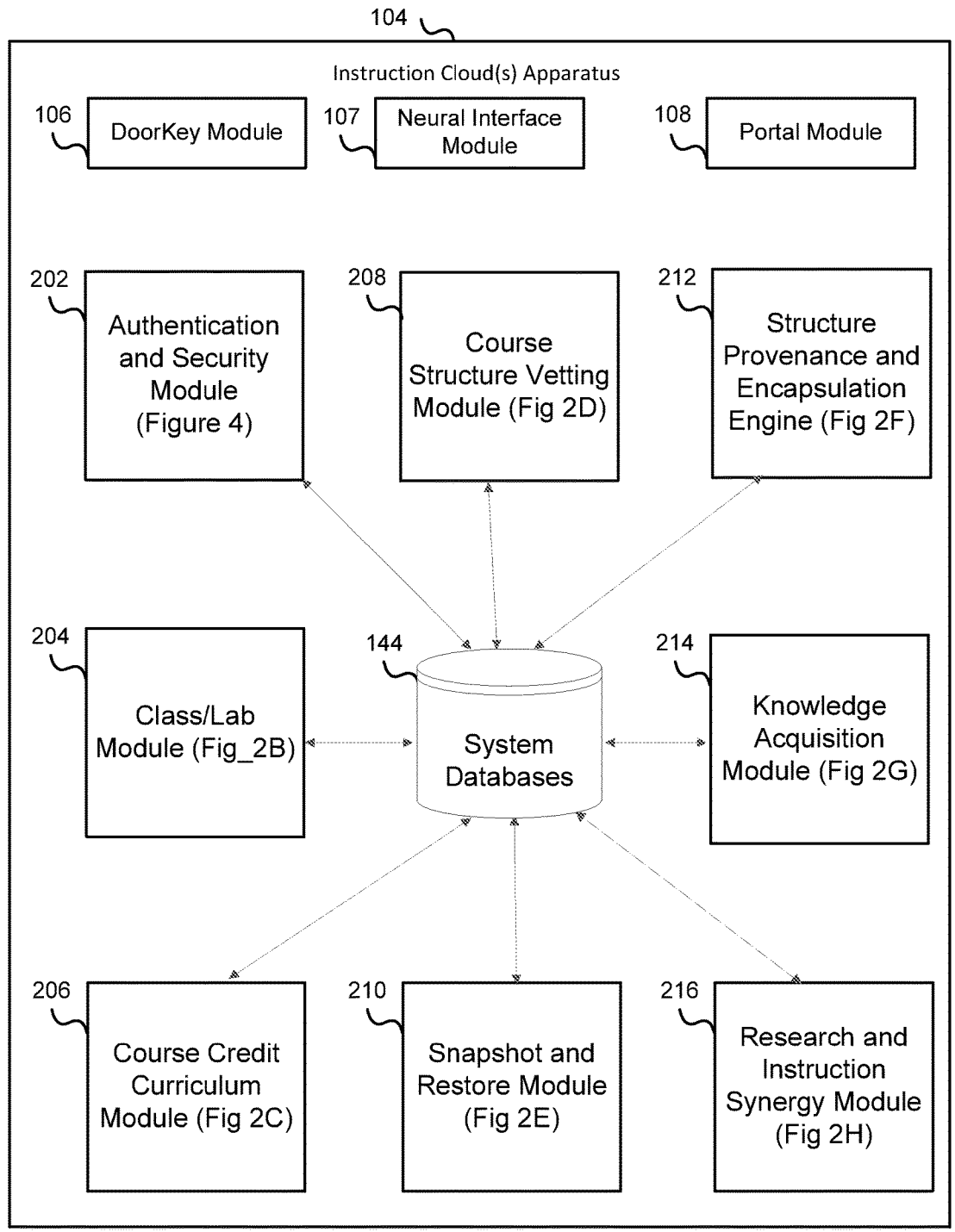
FIG. 2A is a schematic block diagram illustrating one embodiment of an apparatus for providing educational content via a network.

FIG. 2A is a schematic block diagram illustrating one embodiment of an apparatus 104 for providing educational content via a network. In one embodiment, the apparatus includes a door key module 106, a neural interface module 107, a portal module 108, an authentication and security module 202, a course structure vetting module 208, a structure provenance and encapsulation engine 212, a class/lab module 204, system databases 144, knowledge acquisition module 214, course credit curriculum module 206, a snapshot and restore module 210, and a research and instruction synergy module 216. The door key module 106, the neural interface module 107, and the portal module 108 may or may not be substantially similar to the recited modules in FIG. 1.

In one embodiment, an authentication and security module 202 may perform similar functions as a door key module 106. In another embodiment, the authentication and security module 202 may perform other security or authentication functions. For example, an authentication and security module 202 may verify that a user's identify is consistent with a purported identity. Authentication may be accomplished by reception of a keyword or passphrase, physical resemblance, security questions, or other, as one skilled in the art may appreciate.

In one embodiment, the apparatus 104 may include a course structure vetting module 208. A course structure vetting module 208 may facilitate a vettor 132 by maintaining requirements for an academic curriculum. This may allow a vettor 132 to vet an academic curriculum more readily. A course structure vetting module 208 may track requirements for many academic institutions or industry standard requirements.

In another embodiment, the apparatus 104 may include a structure provenance and encapsulation engine 212. A structure provenance and encapsulation engine 212 may provide assurance that a provided academic curriculum is consistent with a vetted academic curriculum. A structure provenance and encapsulation engine 212 may or may not perform substantially similar functions as a provenance module 152. A structure provenance and encapsulation engine 212 may encapsulate a vetted academic curriculum by digitally analyzing digital media associated with the curriculum to generate a digital hash. In another embodiment, a checksum may be used. Other methods may be implemented to ensure that the digital course content objects have not been altered.

In another embodiment, the apparatus 104 may include a class/lab module 204. A class/lab module 204 may include a virtual network designed to simulate a computer laboratory as previously described. In one embodiment, a virtual education laboratory may be used to teach cyber security. For example, a virtual network may include many physical machines communicating via a virtual network. In another example, several virtual machines may be executed on a single physical host machine.

In another embodiment, the apparatus may include a knowledge acquisition module 214. A knowledge acquisition module 214 may request additional information from a crawler module 148. A knowledge acquisition module 214 may receive additional knowledge from a user.

In another embodiment, the apparatus may include a course credit curriculum module 206. A course credit curriculum module 206 may track a curriculum and associated course credits. For example, a course credit curriculum module 206 may indicate that a content object may be an equivalent of three credits.

In one embodiment, the apparatus 204 includes a snapshot and restore module 210. A snapshot and restore module 210 may store a snapshot of a virtual network for future reconstruction. In another embodiment, in response to a user disconnecting from the virtual network, a snapshot and restore module 210 may store a state of the virtual network by storing state information for each of the hosts communicating via the virtual network. In one embodiment, the snapshot and restore module 210 may store a state of the virtual network by storing configuration parameters for each of the network appliances communicating via the virtual network.

In another embodiment, the apparatus 104 may include a research and instruction synergy module 216. A research and instruction synergy module 216 may receive additional educational materials from a user of the apparatus 104. In one embodiment a user of the apparatus includes instructors 124, academic administrators 140, or the like. A research and instruction synergy module 216 may continue to receive additional educational content and request that the received educational content be added to a content object.

In another embodiment, a student 120 and an instructor 124 may collaborate in order to create additional educational content. For example, a content object may include a research component. In this example, a student may perform research for an instructor and receive academic credits for the research. In response to the research, the research and instruction synergy module 216 may integrate results of the research into a content object that may be accessible by future students.

In one embodiment the apparatus 104 may be accessed by an instructor 124 using a door key module 106, a neural interface module 107 and a portal module 108. The system state engine 242 (FIG. 2M) may control the specific apparatus operation (shown in FIGS. 2A through 2M) selected by the instructor 124 or student 120. Administrative operations may be selected by the instructor 124 and a system maintenance 242d state may be entered. A student 120 may enter by default the system usage 242e state. An apparatus operation state may be selected by a Creature, or invoked automatically by a system state engine. For each apparatus operation shown in FIG. 4, Authentication and Security and FIGS. 2A through 2M may be reviewed.

Figure 2B:
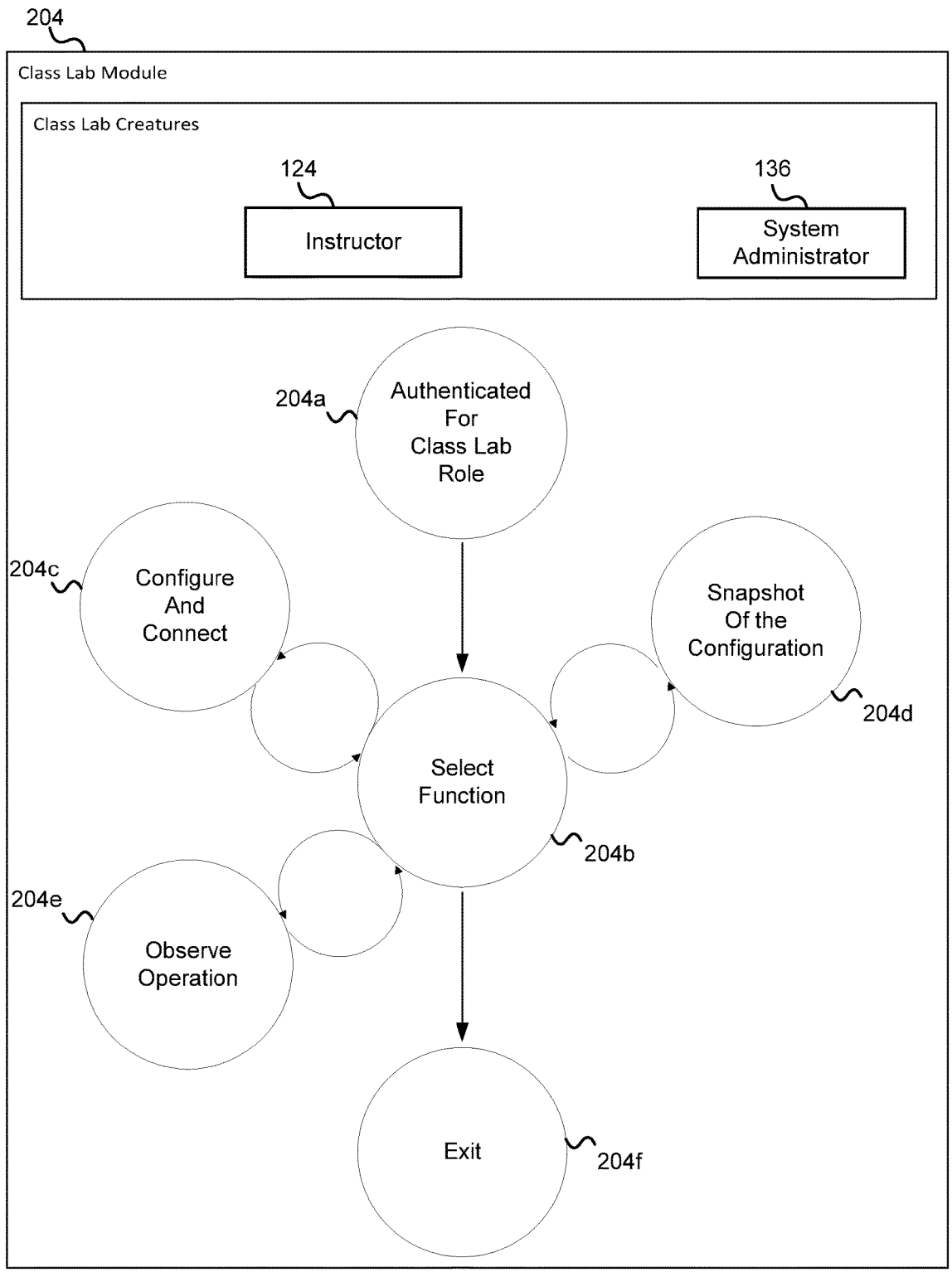
FIG. 2B is a schematic block diagram illustrating one embodiment of a class lab module.

FIG. 2B is a schematic block diagram illustrating one embodiment of a class lab module. In one embodiment, a class lab module 204 may include class lab creatures, such as, but not limited to, an instructor 124, and a system administrator 136. In another embodiment, a class lab creature 124,136 may authenticate for a class lab role. In one embodiment, a class lab creature 124,136 may subsequently select a function. A function may include requesting 204d a snapshot of the current configuration. A function may include configuring 204c the virtual instruction cloud and/or connecting to a host machine in the virtual instruction cloud. For example, an instructor 124 may observe 204e a student completing an operation, such as, but not limited to, completing a content object. In another embodiment, a class lab creature 124,136 may exit 204f the class/lab module 204.

In one embodiment, the class lab module 204 is one of the core modules of the instruction clouds system 100. The class lab module 204 in one embodiment is the environment where students 120 spend the majority of their time. Students receive instruction to augment their learning, and receive instruction sets that lead toward acquiring knowledge resulting in receiving industry certificates or degrees from academic institutions.

A class or lab may first be designed, scheduled and then populated for delivery and finally executed by a student. The class lab module 204 may be accessed by both users and administrators through the system usage 242e state or the system maintenance 242d state of the system state engine 242 (FIG. 2M). The system state engine 242 (FIG. 2M) may control the specific apparatus operation selected by the instructor 124 or student 120. Administrative operations may be selected by the instructor 124 and the system maintenance 242d state may be entered. A student 120 may enter by default the system usage 242e state.

In an embodiment, several of the instructor functions associated with the class lab 204 module (FIG. 2B). The instructor may be authenticated for the class lab role 204a and may enter a select function 204b state from which a configure and connect 204c function may be executed. For example, consider the specific instance of configuring a lab exercise that involves connecting a Windows 8 virtual machine with a Kali Linux penetration testing virtual machine, the virtual machine serving as the target for a lab exercise in nmap scanning of the connected network. Upon completion of the configuration and connection the instructor may return to the select function 204b state and may select to make a snapshot of the configuration 204d. The snapshot and restore module 210 describes this portion of the apparatus. The snapshot of this new exercise for a class lab may be stored in the Cobj database 308e (FIG. 3B). A record of this completed step may be made in the prov-enance prov_completed database 326a (FIG. 3E).

In one embodiment there may be two significant functions for the class lab module 204. The first may be a system maintenance 242*d* role (FIG. 2M) that may involve designing, scheduling and then creating a class or lab by selecting existing CLouts database 308*a* items and populating CLAMs database 308*b* items, modifying teaching objectives database 308*c*, with associated instruction set database 308*d* items, and specific content object Cobj database 308*e* items. In this process, learning environment 156 modules may be accessed that contain resource, matriculation and control elements. Additionally, there may be infrastructure 222 system operation modules that may be selected in the population of the CLAM for a specific class. In one embodiment a lab this entails identifying the operations delivery service provider, an IaaS 222*b* cloud service provider and the specific SO_Import 222*a* of resources needed. In a learning environment with accredited programs, courses are already predefined and the CLouts approved. An instructor 124 may only need to use a CLAM template for the pre-defined course and all of the latter details may be preset.

In one embodiment the second function for the class lab module 204 may be the system usage 242*e* role (FIG. 2M) by a student 120. This is the function where a student may execute a class or lab by following the CLAM defined by the instructor. The student may have already been authenticated for the learning role having set up credentials in the authentication database 304. In one embodiment the student 120 may select from the CLouts database 308*a* a course on learning to fingerprint a network using a network mapping tool, such as nmap. The course has one teaching objective with an instruction set that has a video content object that describes the necessary steps to execute an nmap scanning of a network. In this example, the student may use use a virtual machine that is checked out of the student resource cabinet database 316*a* using authentication credentials previously created. The student may scan the network configuration that the instructor had previously configured as a Windows 8 and Kali Linux topology. The specific class lab rules 322*d* may be followed by the student. The student may complete the exercise by fulfilling the specified deliverables in the CLAM. Successful completion of the course may be recorded in the student academic plan database 318*a* and secure provenance proof of completion may be recorded in the prov_completed database 326*a*.

In another embodiment the instructor 124 may elect to observe the student while the student is completing the nmap scanning exercise previously described. Referring to FIG. 2B, again, at the select function 204*b* state the instructor selects the observe operation 204*e* function and may be able to watch the student complete the assigned CLAM.

In another embodiment for creating a new lab instance refer to Figure 2B, the instructor 124 may be authenticated for the Class Lab role and at the select function 204*b* state selects to configure and connect 204*c* to set up this lab for students. In the state 204*b* the instructor may select a Win 8 virtual machine from the content object database for Cobjs 308*e* and an Ubuntu Linux virtual machine from 308*e*, and establish a network connection between the two virtual machines. From the select function 204*b* the instructor may create a snapshot of this new instruction set IS 308*d*, creates a teaching objective TO in 308*c* and a new CLout 308*a* and CLAM 308*b* in preparation for this lab storing a reference in the SOLE_laboratory database 308*g*.

Figure 2C:
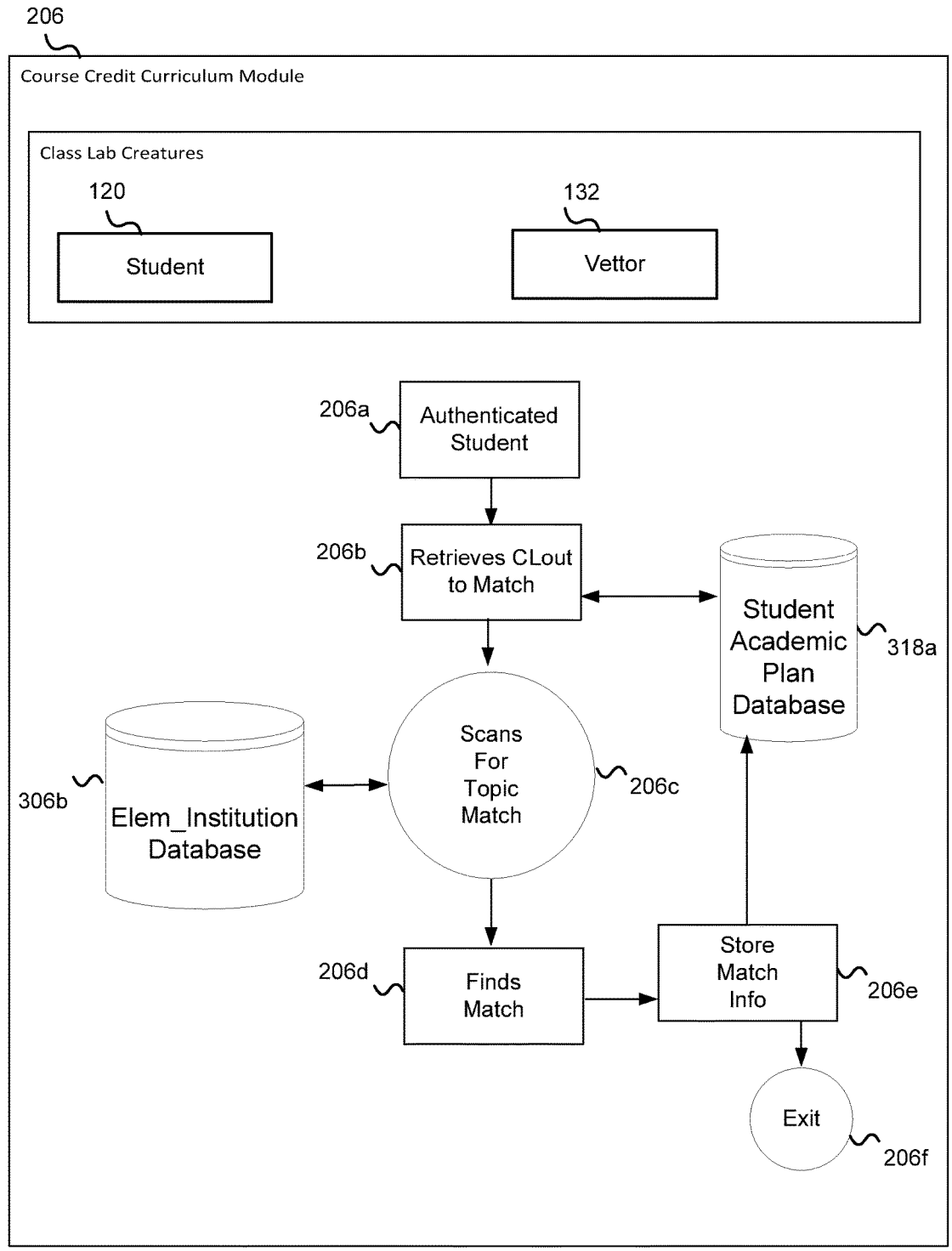
FIG. 2C is a schematic block diagram illustrating one embodiment of a course curriculum module.

FIG. 2C is a schematic block diagram illustrating one embodiment of a course credit curriculum module 206. A course credit curriculum module 206 may include class lab creatures, such as, but not limited to a student 120, or a vettor 132.

A student of a virtual instruction cloud may accumulate credits towards a certification or degree. Because credit hours may be certified and vetted, the credit hours may be transferable to other academic institutions. This may allow a student flexibility in determining which courses to take at a virtual instruction cloud, and which courses to take at a traditional academic institution.

In one embodiment, a student may put together a degree plan, based, at least in part, on available content objects, instructions sets, learning objectives, or the like. Therefore, a student may gradually transition from a casual course recipient, to being on a path towards graduation.

In another embodiment, students who complete instruction clouds system 100 instruction sets and CLouts may desire to receive industry certification credit or academic degree credit for their accomplishments. The student who completes a vetted instruction set may want to search for and find a certification or accredited program that will accept the completed work toward a certification or degree.

In one example, consider the instance where the student described in FIG. 2B now desires to match the CLout used with an academic degree program. FIG. 2C describes the apparatus module 206 that may match work performed with a specific accredited course curriculum. The student successfully completed the exercise and a secure record was made in the prov_completed database 326*a* and the corresponding academic plan database 318*a*. The associated databases may be scanned 206*c* using the student requests database 320*a* and elem_institution databases 306*b* to identify potential candidate programs by a match function 206*d* and store 206*e* these in the student academic plan database 318*a*. With this information the student may elect to enroll in the appropriate degree program that may accept the vetted and completed CLout.

In an embodiment for a student 120 usage of a SOLE_classroom 176, CLouts may be completed with deliverables that need to be passed to the SPE engine to provide proof of completion of deliverables to ensure rubrics have been completed. These records may be included in the Student_Academic_Plan Database 318*a* along with evidence via the Provence Key that SPE Engine output has been recorded. Provenance Prov_Usage Database 326*h* and Prov_Completed Database 326*a*, followed by vetting of the completed work in Prov_Vetted Database 326*e*, provide the evidence required for an accredited institution to accept such work toward an accredited certificate or degree.

Figure 2D:
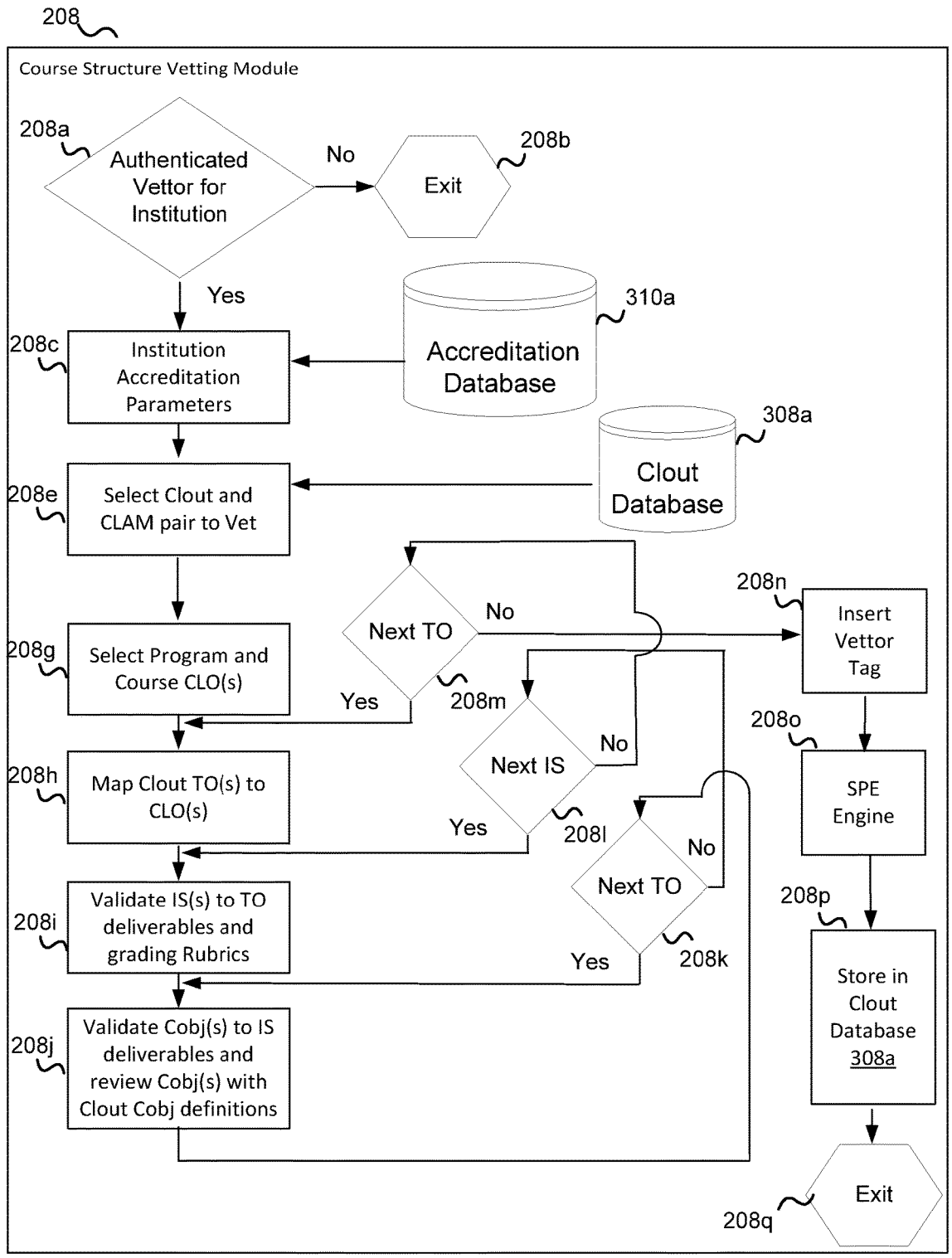
FIG. 2D is a schematic block diagram illustrating one embodiment of a course structure vetting module.

FIG. 2D is a schematic block diagram illustrating one embodiment of a course structure vetting module. In the instruction clouds system 100 one goal may be to have all structures vetted, where structures are CLouts, CLAMs, TOs, ISs and Cobjs. In one embodiment, a vettor may be an instructor who is accredited with an accredited organization, academic or certification.

In another embodiment, a CLout in a CLout database 308*a* may or may not be vetted in an instruction clouds system 100. One goal of the instruction clouds system may be to aggregate teaching objectives and instruction sets as possible as CLouts. A non-vetted CLout, instruction set (IS) or teaching objective (TO) may be vetted by an accredited instructor for either certification or academic accreditation in the course structure vetting module 208 (FIG. 2D).

FIG. 2*d* is a flow diagram of the vetting steps that an accredited and vetted instructor may take to review and vet a course of instruction that is defined to be a CLout. An accredited instructor is an instructor 124 that has been designated accredited by an accredited organization 310*a* and securely designated in the vettor database 302*g*.

Securely means that the structure provenance and encapsulation engine 212 was executed at the time the vettor was credentialed. One embodiment of the vetting procedure starts with the authentication of the vettor 206a. The organization by which he is accredited will have institutional accreditation parameters that are retrieved 206c from the academic institution database 206d. The target CLout and CLAM pair are retrieved from the CLOUT database 308a and CLAM database 308b. The involved program is specified and the associated course CLOs, which are j in number, are identified in step 206g. For all j CLOs each teaching objective TO contents from the CLAM must be mapped to the CLO as specified in 206h. For each TO every instruction set IS must be validated as quality material and all deliverables and grading rubrics for the TO are reviewed in step 206i. In turn, every content object Cobj must be validated to the in step 206j. Items 206k, 206l and 206m are looping logic steps to ensure each Cobj, IS and TO processed. Upon verifying each Cobj the vetting complete and step 206n may insert a tag into the CLout identifying the vettor and the vetted CLout may be passed to the Structure Provenance and Encapsulation Engine (SPE) 208o, FIG. 2f, for encapsulation and recording into the appropriate provenance databases 326. The vetted CLout may be stored 206p in the CLout database 308a, and may contain a vetting tag. For example, the vetting tag may be a digitally signed CLout. A creature may then exit 208q the course structure vetting module.

In one embodiment, a hierarchy of education content includes teaching objectives, to instruction sets, to Clout (course learning outcome), to course learning objective (CLO). Of course, other organizations may be used, and this application is not limited in this regard.

In one embodiment, block 208h may map association content objects to courses at another accredited institutional academic institution. Therefore, a content object vetting environment may be used to receive equivalent educational content from another accredited academic institution. For example, a program learning objective may allow a student of the virtual instruction cloud to achieve academic progress at another educational institution.

For example, a program learning objective (PLO) may be substantially replicated via several content objects in the virtual instruction cloud. Therefore, a unification of content objects and PLO's may be accomplished by mapping content objects with PLO requirements. In another embodiment, a provenance module 152 may assure that a content object has not been changed from when it was associated with a vetted academic curriculum.

Figure 2E:
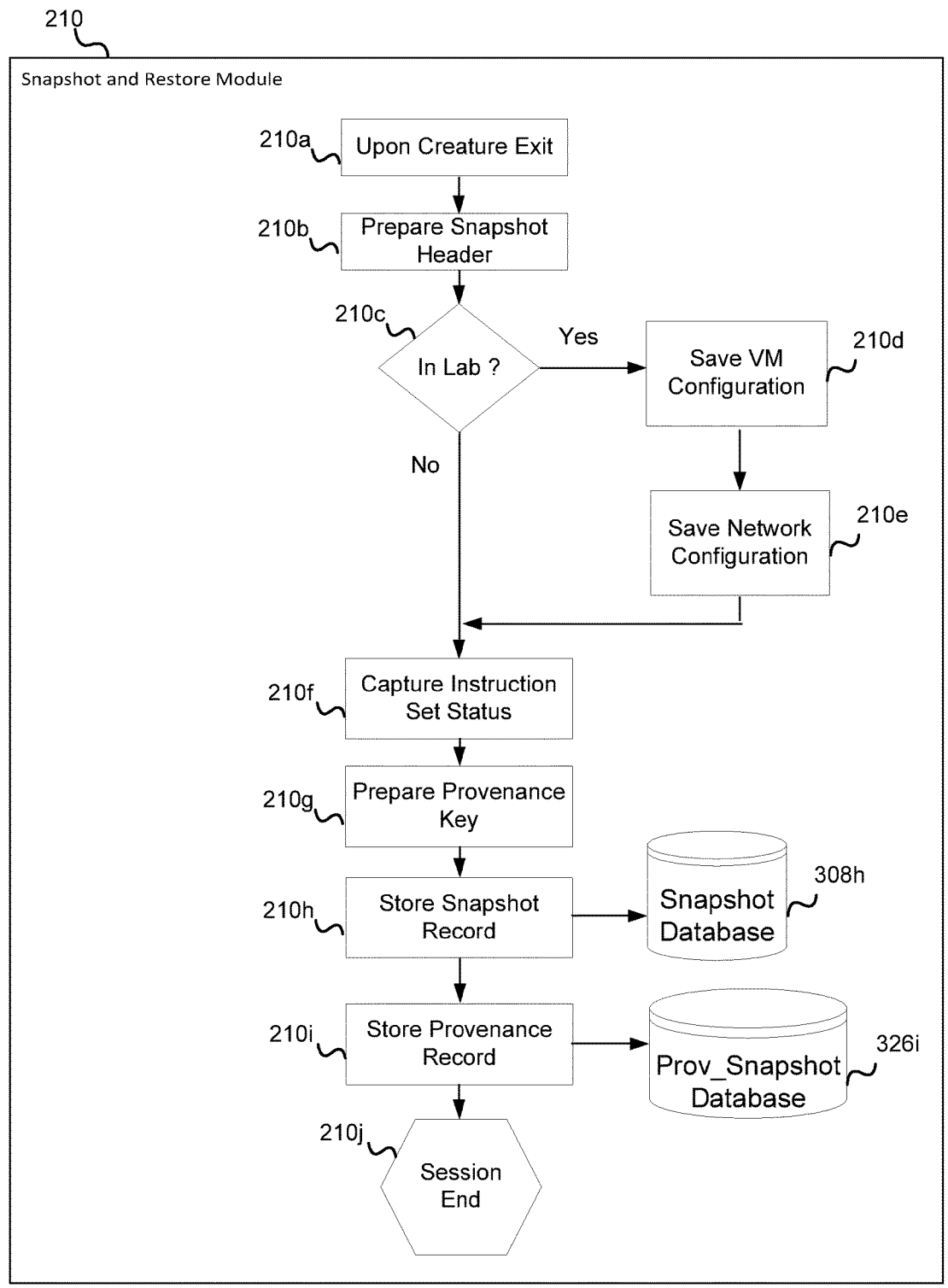
FIG. 2E is a schematic block diagram illustrating one embodiment of a snapshot and restore module.

FIG. 2E is a schematic block diagram illustrating one embodiment of a snapshot and restore module. In one embodiment, the snapshot and restore module may have two distinct and opposite functions.

In one embodiment the snapshot operation may be automatically executed when a creature initiates an exit from the instruction clouds system 100. This operation is shown in the flow diagram of FIG. 2e and has as its objective to capture the entire operating, learning state of the user. This may facilitate a restoration of the learning environment upon the user return entry to the instruction clouds system 100. The snapshot procedure may be initiated when state 210a is triggered by a creature signaling a desire to exit the system. Step 210b prepares the snapshot header that contains creature identity data, a summary of the operating environment virtual machines and all software being used and the database states at this instance in time.

In one example, a lab is in process 210c, hardware and software configuration data for all virtual machines 210d and network devices 210e may be captured and appended to the snapshot header. CPU instruction set data 210f may be captured and an encrypted provenance key 210g may be prepared. The assembled snapshot record may be stored 210h in the snapshot database 308h. A provenance record may be assembled and stored 210i in the Prov_snapshot database 326i. This procedure may provide proof of completion of an instruction set and teaching objective. The snapshot may procedure concludes with 210j.

In another embodiment, a restore operation may restore the entire previously operating learning state. Restoring the learning state may include accessing the secure learning image from the snapshot database 308h upon the user return entry to the instruction clouds system 100. This may be done after having essentially "paused" the learning exercise.

In another embodiment, the Snapshot and Restore module 210 may use a combination of digital blocks and byte level change logs to store a compressed representation of the instruction cloud structure's state at the time the snapshot is stored in the Snapshot database 308h. One embodiment of the compression function includes the use of encryption technology to digitally fingerprint the changes to the virtual environment. In one example, the snapshot module may be used to save all virtual machine configuration changes including desktop settings and local disk configurations. In another example, the snapshot module may be used to save all network configuration changes from the system baseline. The snapshot and restore module 210 may use a portal module's 108 settings to identify the structures which must be saved.

The restore function of the Snapshot and restore module 210 instantiates all relevant structures and then executes the digital blocks and byte level change logs to restore the user's instruction cloud structures to their prior states.

Figure 2F:
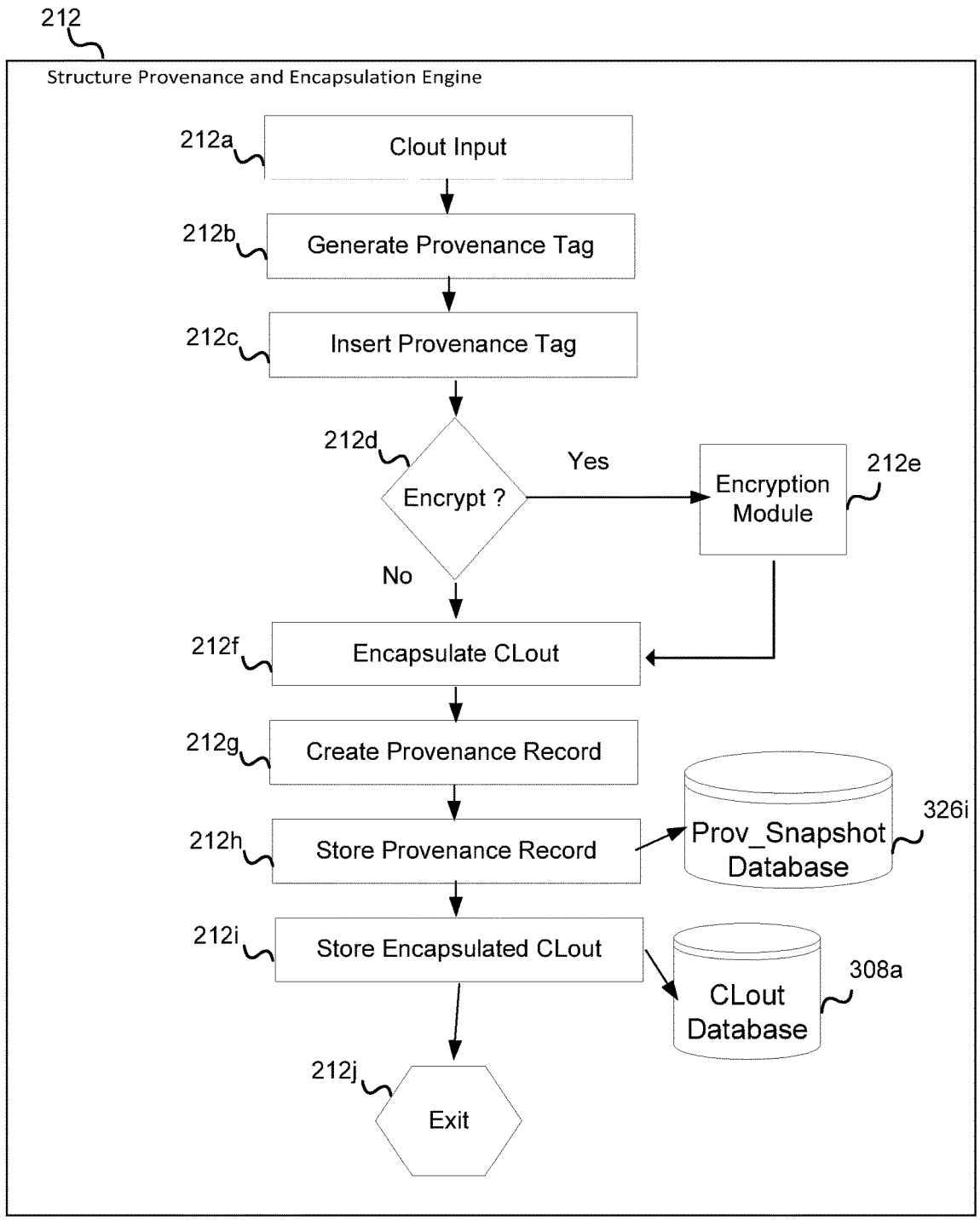
FIG. 2F is a flow chart diagram illustrating one embodiment of a method for a structure provenance and encapsulation engine.

FIG. 2F is a flow chart diagram illustrating one embodiment of a method for a structure provenance and encapsulation engine. The Structure Provenance and Encapsulation (SPE) Engine may be executed upon all instruction clouds system 100 structures whenever key milestones are met. This may provide secure, non-refutable proof that an event occurred. In one embodiment structures include CLouts, CLAMs, TOs, ISs, Cobj, Class databases and Lab databases. In one embodiment encapsulation may be provided by digitally signing all provenance records. Additionally, if researchers 128 or other Creatures need to provide confidentiality then encryption 202 may be combined with encapsulation.

In one embodiment the SPE Engine may be used when a new lab is created such as that described for FIG. 2b. Also, in another embodiment, an updated mpeg4 video demonstrating an art history topic may be submitted to the SPE Engine for recording the birth and authorship of the new video. Furthermore, once this new IS and CLout is created it can be vetted and the SPE Engine invoked in each instance of repeated vetting.

In an embodiment for student 120 usage of a SOLE_classroom 176, CLouts will be completed with deliverables that need to be passed to the SPE engine. This may provide proof of completion of deliverables to ensure rubrics have been completed. These records may be included in the Student_Academic_Plan Database 318a along with evidence via the Provence Key that SPE Engine output has been recorded. Provenance Prov_Usage Database 326h and Prov_Completed Database 326a followed by vetting of the completed work in Prov_Vetted Database 326e provide the evidence required for an accredited institution to accept such work toward an accredited certificate or degree.

In another embodiment, a Clout may be structured. Provenance tags may be used to log or otherwise identify operations that occurred on the virtual instruction cloud. In another embodiment, provenance records may identify all operations that occurred (including changes). In one embodiment, lecture materials may be removed from a curriculum and the curriculum may need to be vetted again. This may help ensure that an academic curriculum may remain consistent with academic requirements for other academic institutions.

In another embodiment, a provenance module 152 may ensure that illegal or otherwise inappropriate material does not become integrated into a program, or an educational session.

Figure 2G:
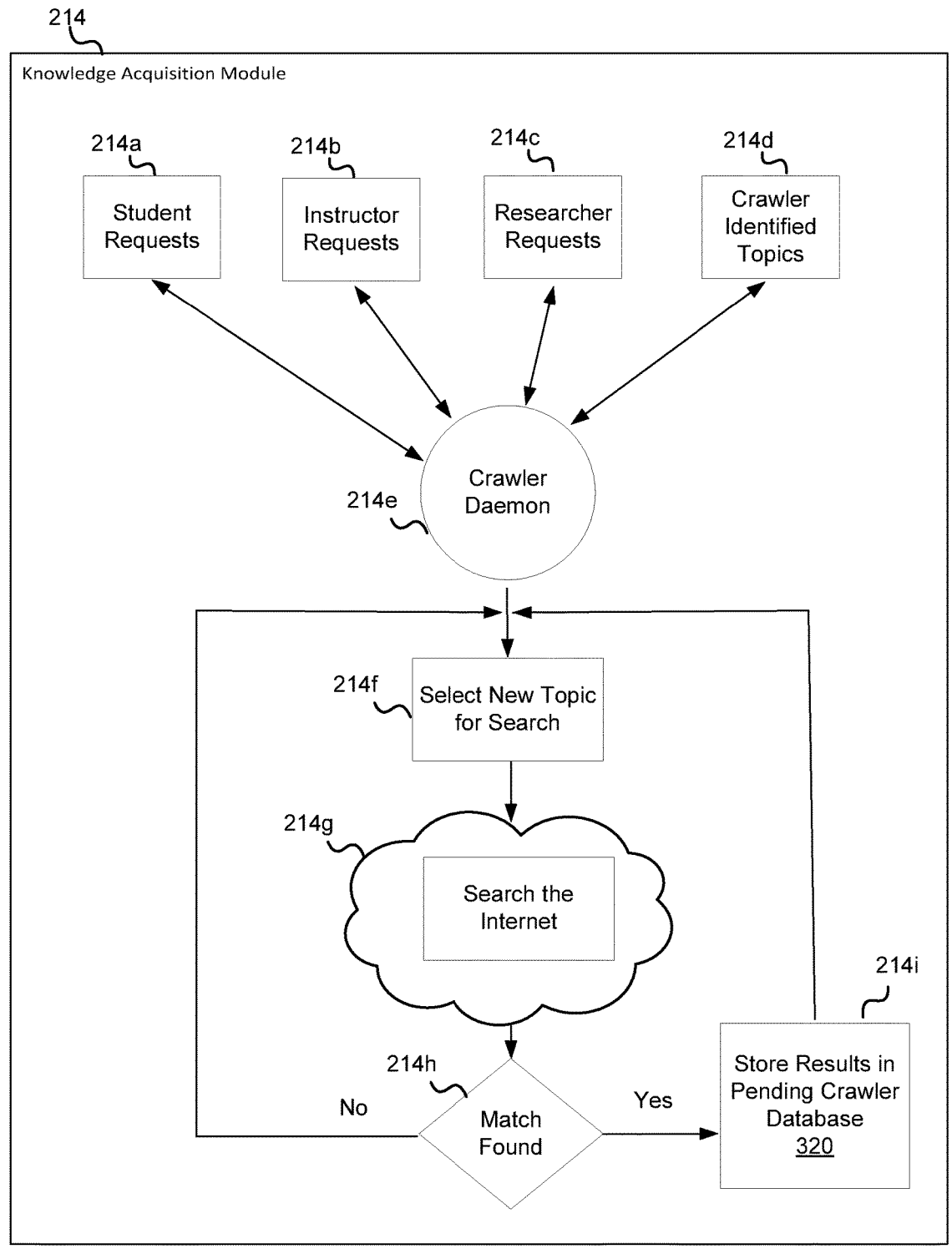
FIG. 2G is a diagram illustrating one embodiment of a knowledge acquisition module.

FIG. 2G is a diagram illustrating one embodiment of a knowledge acquisition module 214. A Knowledge Acquisition Module 214 may be the apparatus that ensures that the instruction clouds system 100 dynamically acquires new instructional material that becomes vetted by accredited instructors/vettors. FIG. 1 in one embodiment introduced the crawler module 148 that is a daemon traversing a network, such as the Internet, in search of new content objects Cobjs and IS and TO material to vet. The relationship that instruction clouds system 100 establishes with Object Creators 142 in order to introduce their Cobjs for use by Creatures and ultimate vetting 132 and 208 and provide a means of generating usage royalty payment to Object Creators 142 is a powerful means of acquiring new knowledge in the SOLE_Library 184 and SOLE_Laboratory 180.

In one embodiment, a knowledge acquisition module 214 may use the SMKA_Crawler 236a as search criteria and places potential knowledge material in the SMKA_Pending module and their respective databases (these remain unspecified). In one embodiment there is synergy between students 120, instructors 124 and researchers 128 that is discussed in greater detail in FIG. 2h. From an academic perspective this triad of students-instructors-researchers provides an age-proven methodology for priming the knowledge acquisition engine. The instruction clouds system 100 has built in methods for tapping the wants and creations of these three contributor areas and incorporating them into new instructional content objects Cobjs.

Figure 2H:
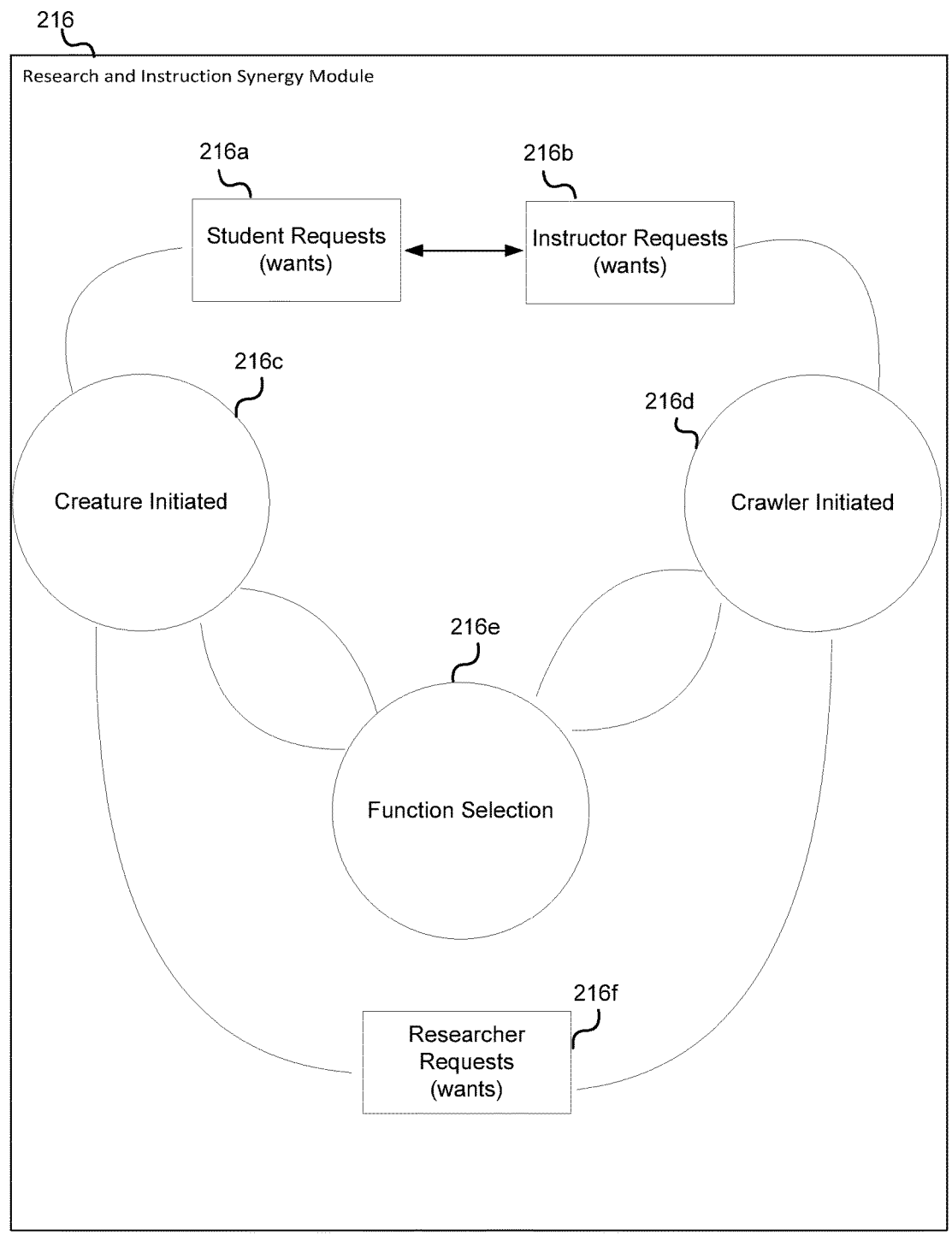
FIG. 2H is a diagram illustrating one embodiment of a research and instruction synergy module.

FIG. 2H is a diagram illustrating one embodiment of a research and instruction synergy module 216. In one embodiment the Research and Instruction Synergy Module 216 provides an authenticated and secure 202 means to support academic-to-academic secure communication. In another embodiment, the research and instruction synergy module 216 may ensure confidentiality as required. The vetting module 150 and the provenance module 152 for research and patent purposes is built into the instruction clouds system 100. The interaction between Creatures ensures knowledge acquisition and constant growth of the instruction clouds environment. Open communication of wants by creatures accelerates the learning and teaching processes as crawler daemons cross index and match the wants. New research concepts from other databases, such as the Elem_Research Databases Research Program Database 312a and Research Publication Database 312b, provide immediate additions for the SMKA_Pending module 236b.

Figure 2I:
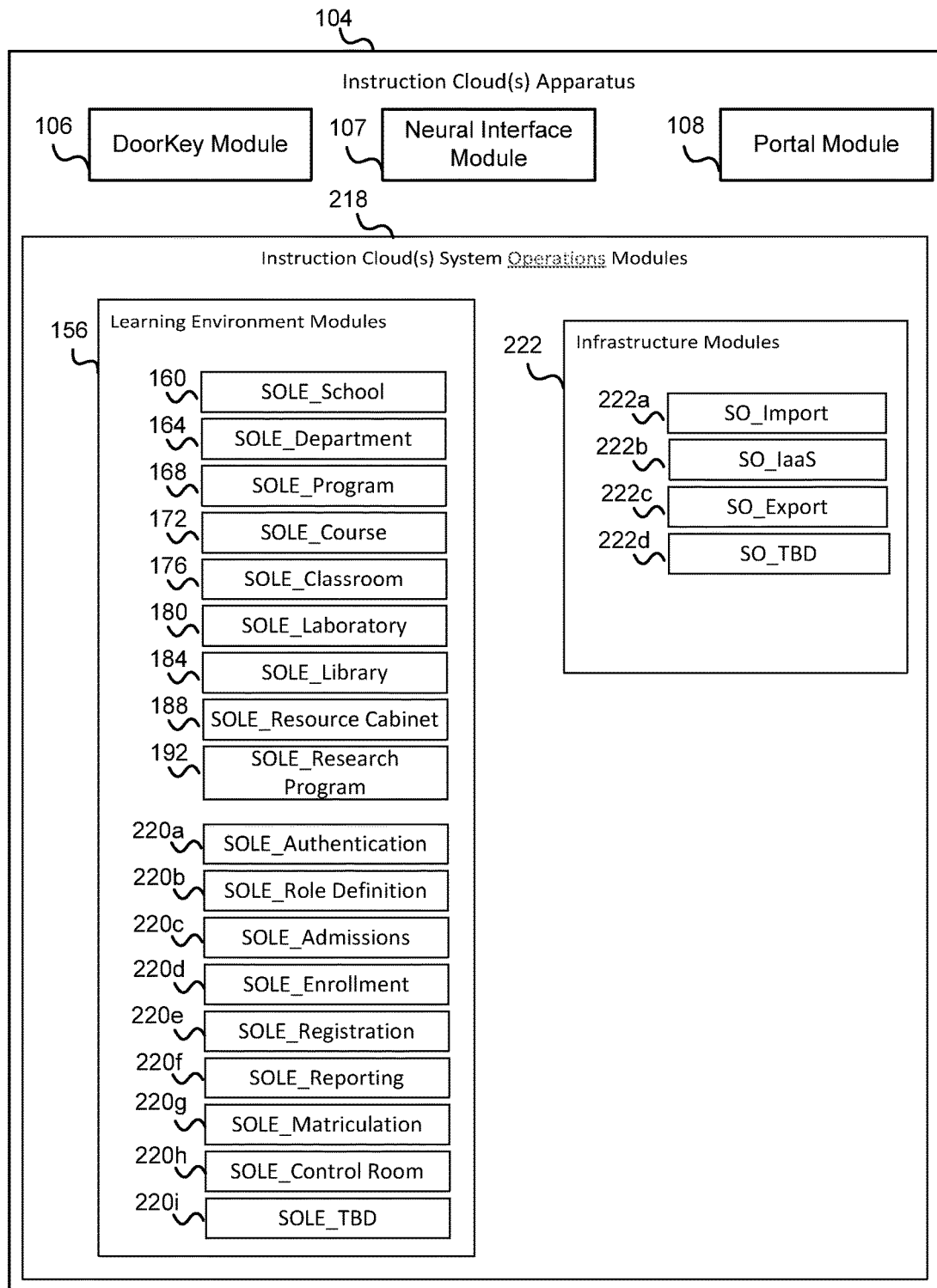
FIG. 2I is a schematic block diagram illustrating one embodiment of an apparatus for providing educational content via a network.

FIG. 2I is a schematic block diagram illustrating one embodiment of an apparatus for providing educational content via a network.

In one embodiment, a SOLE_School module 160 may mimic a non-virtual school, and perform similar functions.

In one embodiment, a SOLE_Department module 164 of the apparatus may mimic a non-virtual department, and perform similar functions. In one embodiment, a SOLE_Program module 168 of the apparatus may mimic a non-virtual program, and perform similar functions. In one embodiment, a SOLE_Course module 172 of the apparatus may mimic a non-virtual course, and perform similar funcations. In one embodiment, a SOLE_Classroom module 176 of the apparatus may mimic a non-virtual classroom, and perform similar funcations. In one embodiment, a SOLE_Laboratory module 180 of the apparatus may mimic a non-virtual laboratory, and perform similar funcations. In one embodiment, a SOLE_ResourceCabinet module 188 of the apparatus may mimic a non-virtual resource cabinet, and perform similar funcations. In one embodiment, a SOLE_ResearchProgram module 192 of the apparatus may mimic a non-virtual research program, and perform similar funcations. In one embodiment, a SOLE_School module 160 of the apparatus may mimic a non-virtual school, and perform similar funcations.

In one embodiment, a SOLE_Authentication module 220a of the apparatus may mimic a non-virtual authentication, and perform similar functions. In one embodiment, a SOLE_RoleDefinition module 220b of the apparatus may mimic a non-virtual role definition, and perform similar functions. In one embodiment, a SOLE_Admissions module 220c of the apparatus may mimic non-virtual admissions procedures, and perform similar functions. In one embodiment, a SOLE_Enrollment module 220d of the apparatus may mimic non-virtual enrollment procedures, and perform similar functions. In one embodiment, a SOLE_Registration module 220e of the apparatus may mimic non-virtual registration procedures, and perform similar functions. In one embodiment, a SOLE_Reporting module 220f of the apparatus may mimic non-virtual reporting, and perform similar functions. In one embodiment, a SOLE_Matriculation module 220g of the apparatus may mimic non-virtual matriculation procedures, and perform similar functions. In one embodiment, a SOLE_ControlRoom module 220h of the apparatus may mimic non-virtual control room procedures, and perform similar functions. In one embodiment, a SOLE_TBD module 220a of the apparatus may mimic other functions for academic procedures to be decided.

In one embodiment, a role definition module may modify a role from a student to a teacher, from a researcher to an instructor, or the like. Additionally, creatures may have multiple roles, such as, but not limited to, a system administrator, an academic administrator, an instructor, or the like. In one embodiment, an SOLE_Enrollment module may collect information from the student that will enroll. In another embodiment, an SOLE_Registration module may allow a student to register for one or more courses, learning objectives, content object, CLout's, or the like.

In one embodiment, various infrastructure modules 222 may replicate associated infrastructure capabilities. For example, an infrastructure module 222a may perform functions to import infrastructure information. In another embodiment, an infrastructure service may be provided by a third party. Infrastructure services may include cloud services, cloud service providers, approved cloud definitions, or the like. In one embodiment, a student may import reference materials.

Figure 2J:
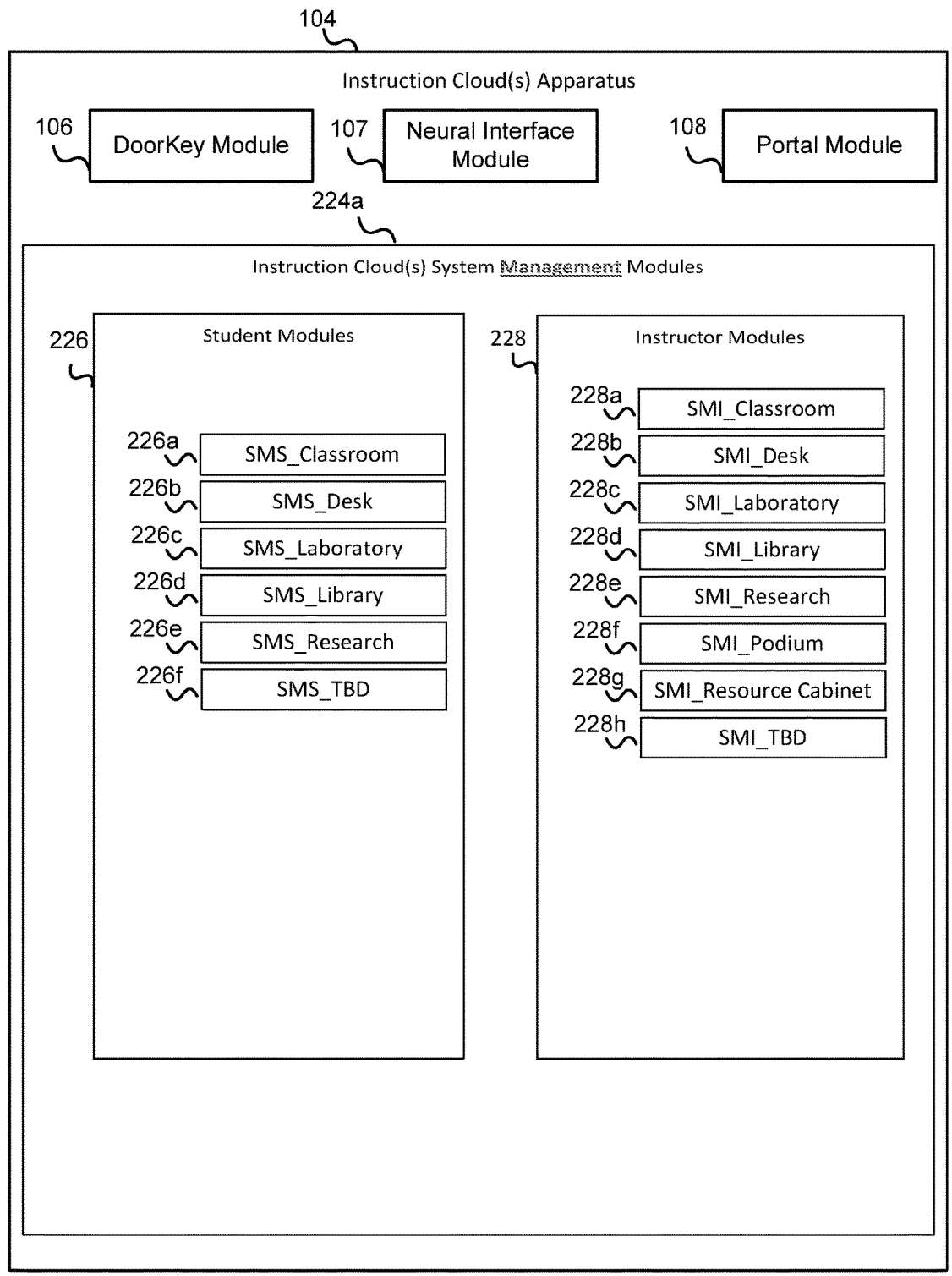
FIG. 2J is a schematic block diagram illustrating one embodiment of an apparatus for providing educational content via a network.

FIG. 2J is a schematic block diagram illustrating one embodiment of an apparatus for providing educational content via a network. The apparatus 104 may include a door key module 106, a neural interface module 108, a portal module 108, and instruction cloud system management modules 224a. Similar to FIG. 2I, an apparatus 104, may include various modules 226,228 in order to associate physical aspects to a traditional educational environment to virtual features of a virtual instruction cloud.

Therefore, an SMS_Classroom, does not necessarily represent an actual physical classroom, but it can be used to organize the virtual instruction cloud so as to include functionality associated with a physical classroom. In one example, a video may be transmitted such that only students in the virtual classroom may view the video.

Figure 2K:
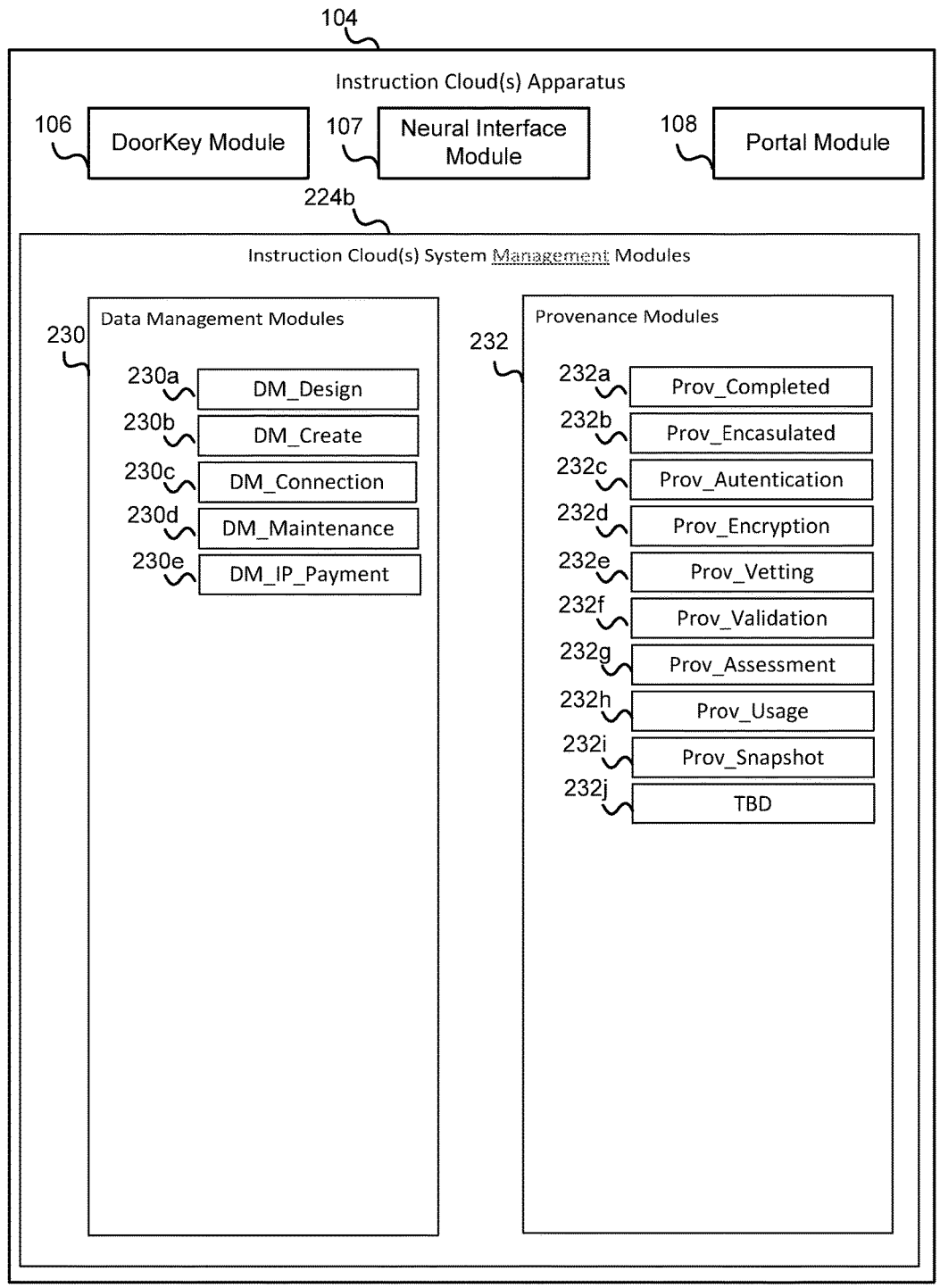
FIG. 2K is a schematic block diagram illustrating one embodiment of an apparatus for providing educational content via a network.

FIG. 2K is a schematic block diagram illustrating one embodiment of an apparatus for providing educational content via a network. The apparatus 104 may include a door key module 106, a neural interface module 108, a portal module 108, and instruction cloud system management modules 224b. Similar to FIG. 2I, an apparatus 104, may include various modules 230,232 in order to perform functions supporting respective features.

In one embodiment, the instruction cloud management modules 224b includes a DM_Design module 230a, a DM_Create module 230b, a DM_Connection module 230c, a DM_Maintenance module 230d, and a to be decided module (TBD) 230e.

In another embodiment, the various database module 230 may store database content for any of the modules described in this application. For example, a database may store an image, whereby the image may be made available to instructors designing a content object, a course objective, an instruction set, or the like.

In another embodiment, a provenance module 152 may regenerate a digital fingerprint for a content object, for example, in response to an instructor modifying the content object. Additionally, a vetting module may re-vet the content object. In one embodiment, a PROV_Authentication module may capture further details for a user. Therefore, a PROV_Authentication module may ensure identities of students, teachers, or other creatures of the virtual instruction cloud. In one embodiment, a PROV_Usage module, may log modifications to an educational session, a content object, an instruction set, a CLout, or the like.

Figure 2L:
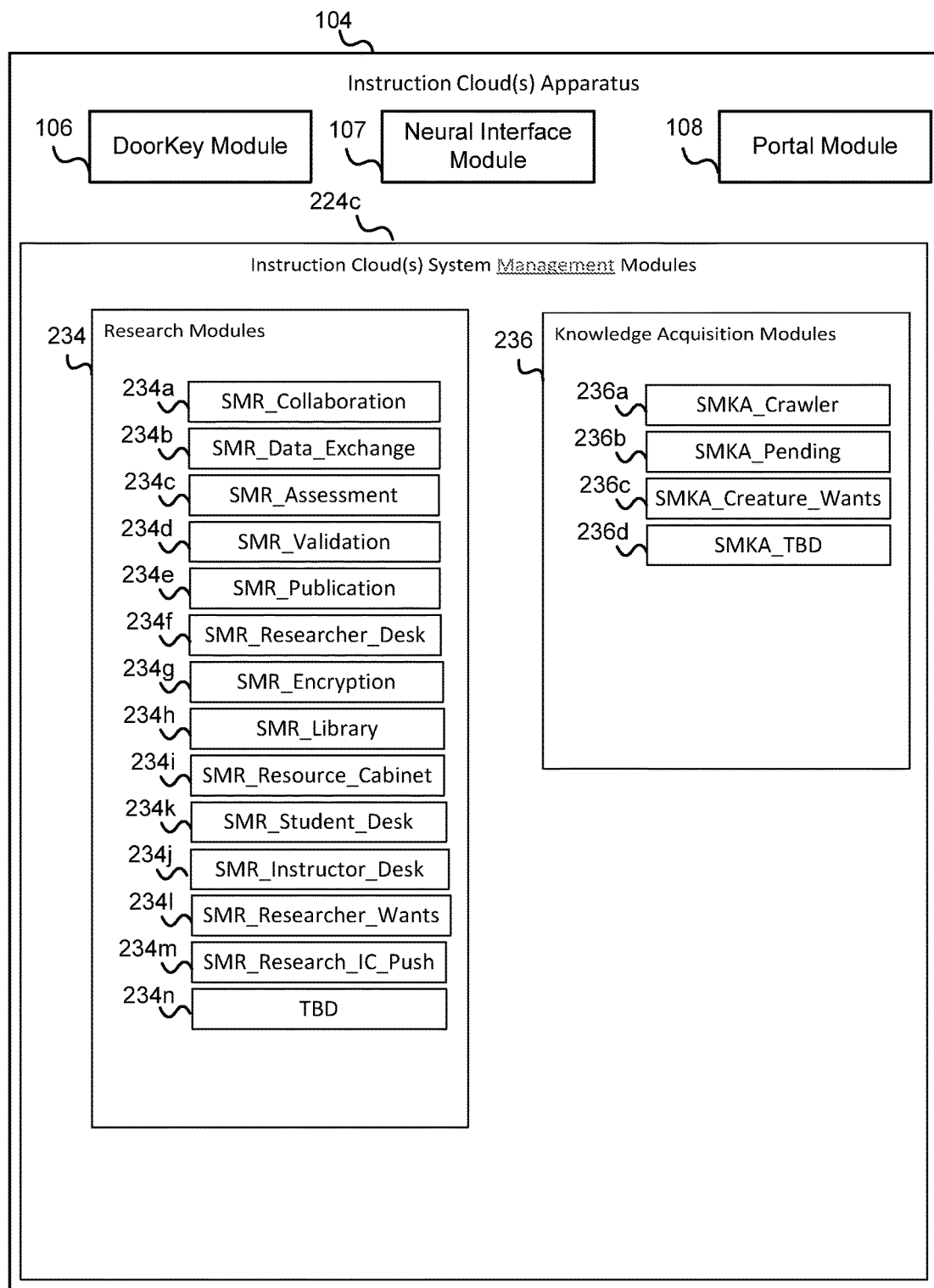
FIG. 2L is a schematic block diagram illustrating one embodiment of an apparatus for providing educational content via a network.
Figure 2M:
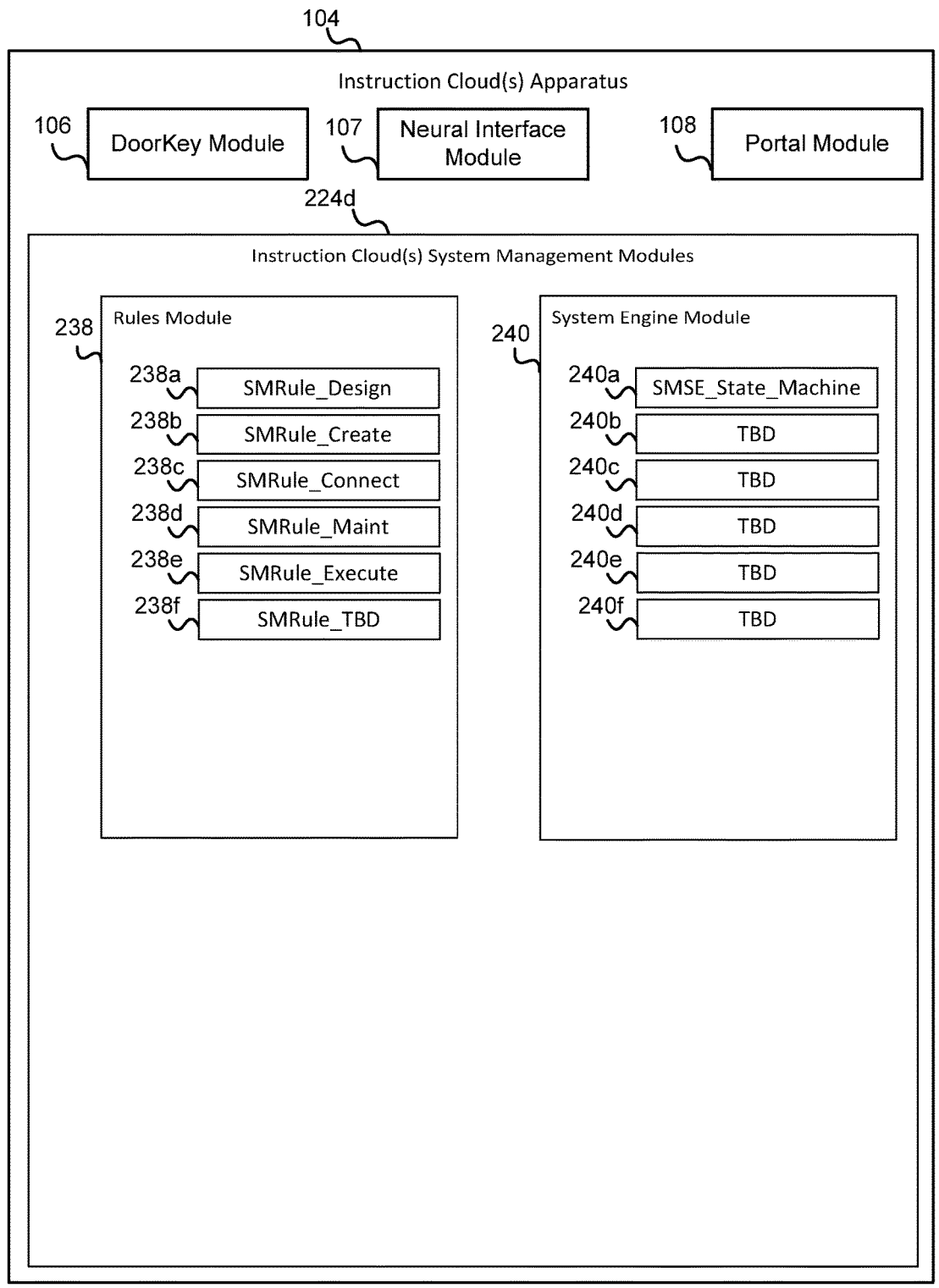
FIG. 2M is a schematic block diagram illustrating one embodiment of an apparatus for providing educational content via a network.

FIG. 2L is a schematic block diagram illustrating one embodiment of an apparatus for providing educational content via a network. The apparatus 104 may include a door key module 106, a neural interface module 108, a portal module 108, and instruction cloud system management modules 224c.

In one embodiment, an SMR_Collaboration module may facilitate communication between professors are different academic institutions. For example, a professor at academic institution A may be a user for the virtual instruction cloud, and a professor at academic institution B may be another user for the virtual instruction cloud. A SMR_Collaboration module 234a may facilitate collaboration on research between the professors.

In another embodiment, the SMR_Collaboration module may communicate to different clouds, different virtual instruction clouds, different networks, or the like. An SMR_Collaboration module may provide a way for professors to share their research with each other, without sharing the research with the public. In one embodiment, the SMR_Collaboration module 234a may receive research results and track which professor submitted which results. In this way, research results may be associated with professors. This may help to ensure that research results are correctly attributed to the professor that generated the research. In a further embodiment, a provenance module 152 may snapshot the collaboration module to provide historical status of the collaboration efforts.

FIG. 2M is a schematic block diagram illustrating one embodiment of an apparatus 104 for providing educational content via a network.

In one embodiment, a state machine may be used to structure learning objectives, content objects, instruction sets, or the like. In one example, a rule for a state machine may be added to ensure that a license is available before media content may be played or distributed. In another example, a rule may prohibit graphic or inappropriate content to be distributed. In another example, a rule may require certain qualifications for instructors. For example, a rule may require instructors to have certain academic qualifications before they may e allowed to perform the role of an instructor, an academic administrator.

Figure 2N:
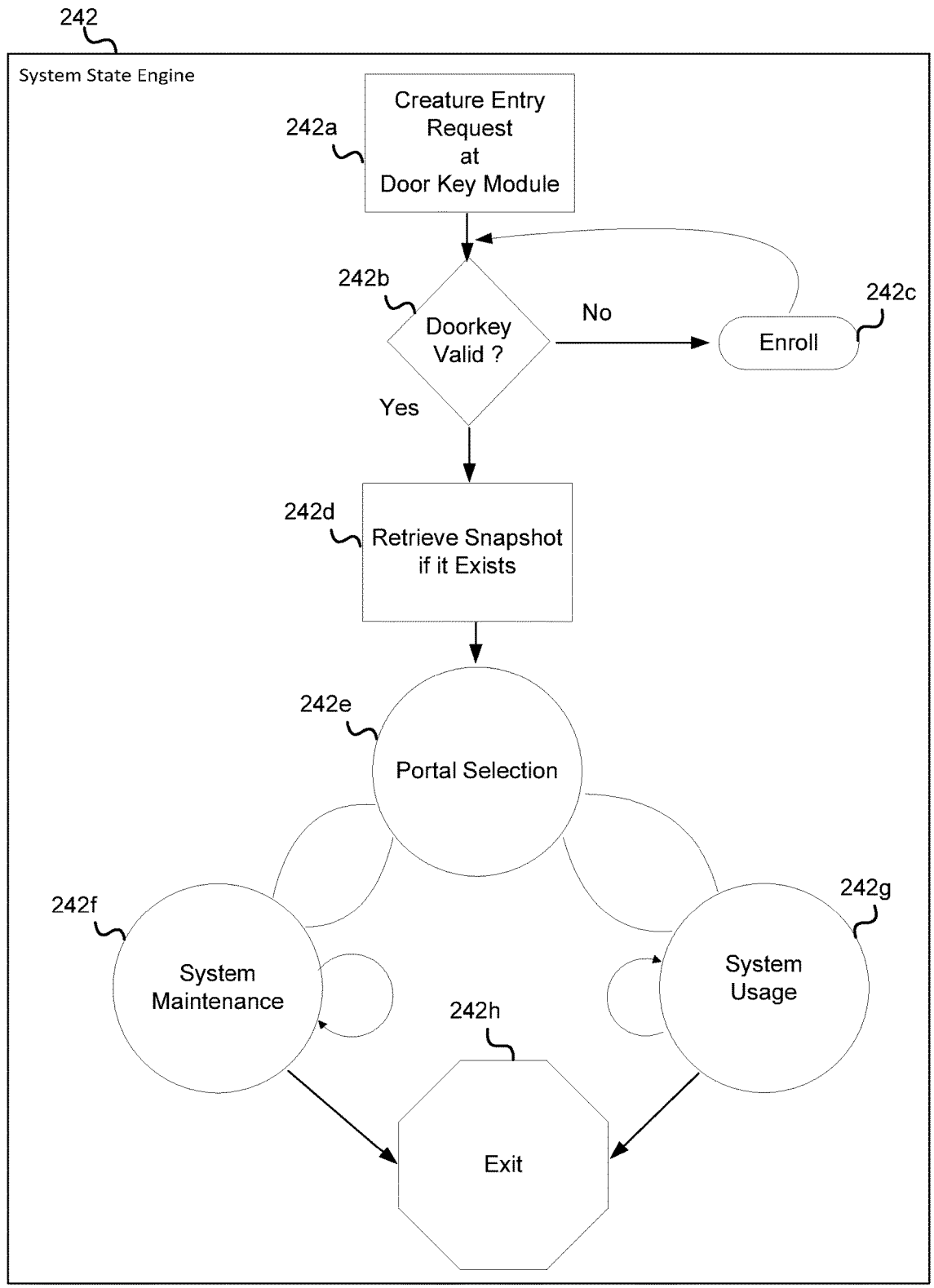
FIG. 2N is a schematic block diagram illustrating one embodiment of a system state engine.

FIG. 2N is a flow chart diagram illustrating one embodiment of a method for a virtual instruction cloud. In one embodiment, a creature may request 242a entry at a door key module 106. If a door key authentication is not valid 242b, the creature may be requested to enroll 242c in the virtual instruction cloud. If the door key authentication is valid, the virtual instruction cloud may retrieve a snapshot for a virtual network. A creature may thereafter select 242e a portal to use. In one embodiment, a creature may select to use 242g the system. In another embodiment, a creature may select to maintain 242f the system. A creature may then exit 242h the virtual instruction cloud.

Figure 3A:
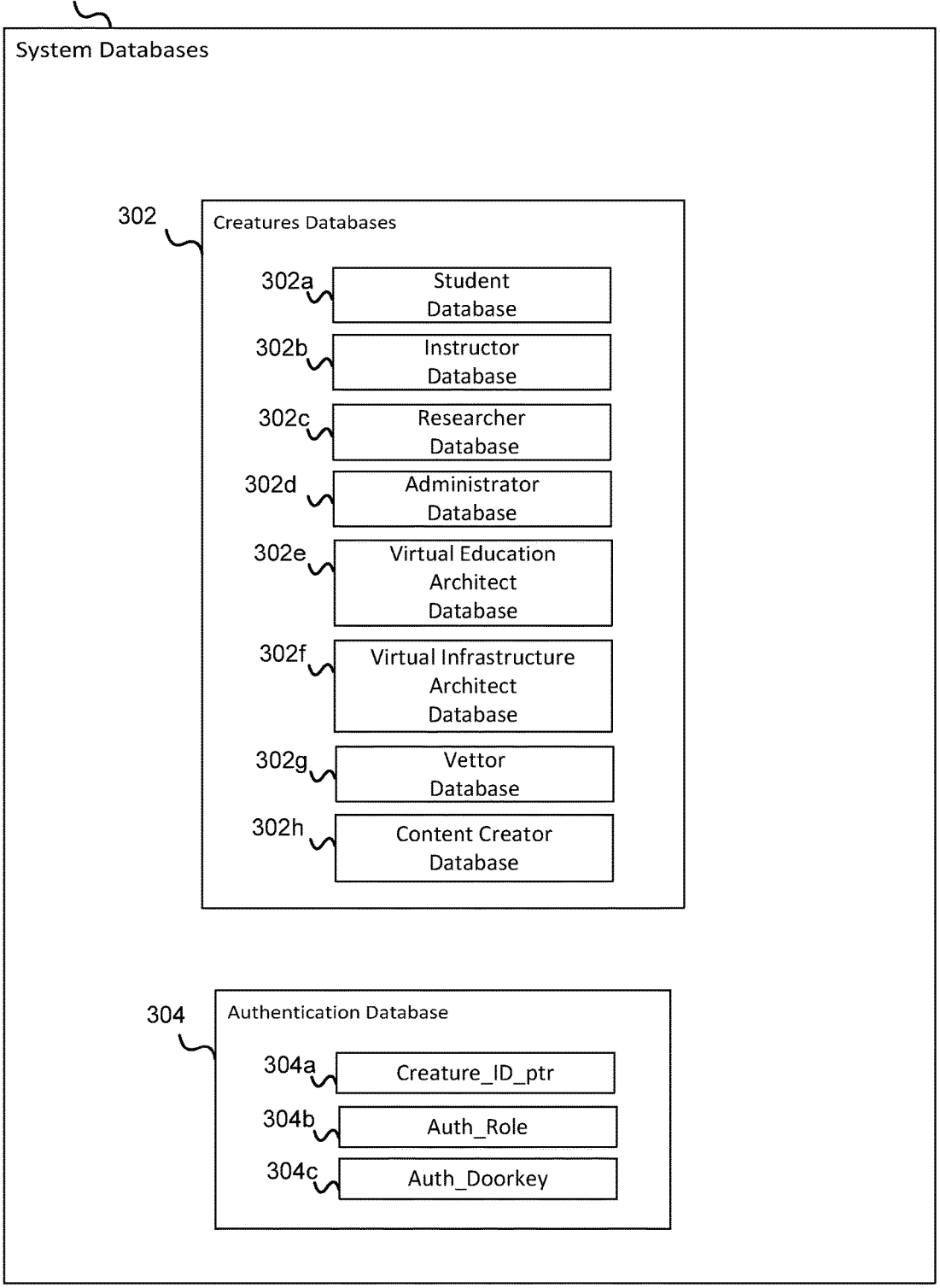
FIG. 3A is a schematic block diagram illustrating embodiments of system databases.
Figure 3B:
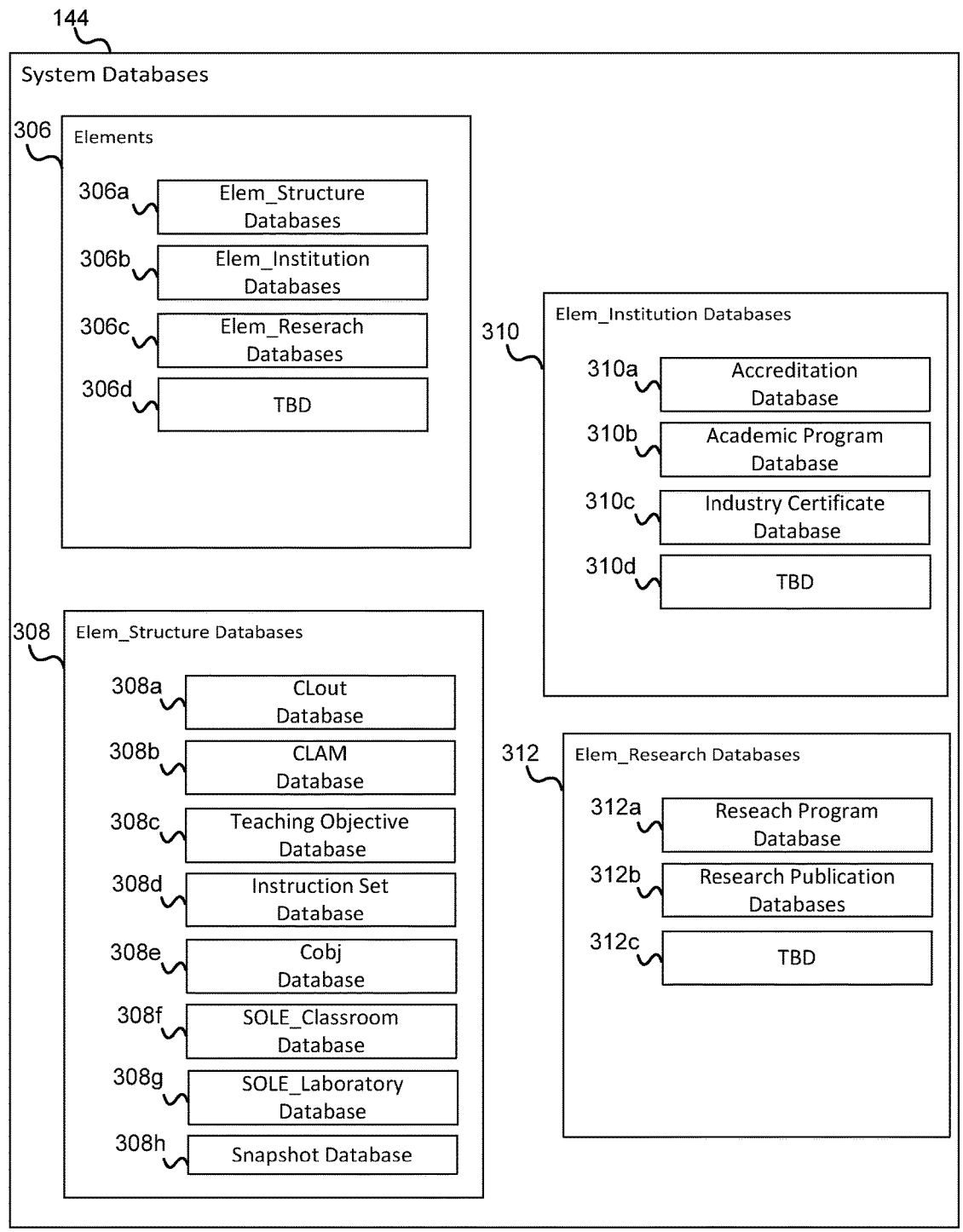
FIG. 3B is a schematic block diagram illustrating embodiments of system databases.

FIG. 3A is a schematic block diagram illustrating embodiments of system databases. In one embodiment, the system databases 144 includes a student database 302a, an instructor database 302b, a researcher database 302c, an administrator database 302d, virtual education architect database 302e, a virtual infrastructure architect database 302f, a vettor database 302g, a content creator database 302h, In one embodiment, the system databases 144 include a content creator database. A creature that has permissions to add content to the virtual instruction cloud may insert create content for inclusion.

In another embodiment, the system databases 144 includes an authentication database 304. An authentication database 304 may store password for creatures of the virtual instruction cloud. In another embodiment, the authentication database may store roles for creatures of the virtual instruction cloud.

In one embodiment, the authentication database may require a multifactor authentication. For example, the authentication database may require two or more of a password, a call back code, a biometric fingerprint, a digital key, or the like.

In another embodiment, administrators may require more authentication credentials than a student. This may help secure the configuration of the virtual instruction cloud by making it more difficult for non-administrators to gain administrative access. In another embodiment, the authentication database 304 includes a a creature ID field, 304a, an auth_role field 304b, and a auth_doorkey field 304c.

FIG. 3B is a schematic block diagram illustrating embodiments of system databases. In one embodiment, the system databases include elements 306, elem_institution databases 310, elem_structure databases 308, and elem_research databases 312.

In another embodiment, the elem_institution databases 310 includes an accreditation database 310a, an academic program database 310b, and an industry certificate database 310c. In one embodiment, the elem_structure database 308 includes a CLout database 308a, a CLAM database 308b, a teaching objective database 308c, an instruction set database 308d, a CObj database 308e, an SOLE_Classroom database 308f, an SOLE_Laboratory database 308g, and a snapshot database 308h. Respective databases store data relative to their functions. For example, an accreditation database may store data for managing accreditations, an academic program database may store data relative to an academic program, etc.

In one embodiment, elem_research databases include at least a research program database 312a and a research publication database 312b. A research program database 312a may store data regarding various research activities of creatures for the virtual instruction cloud. A research publication database 312b may store research publications for creatures of the virtual instruction cloud.

Figure 3C:
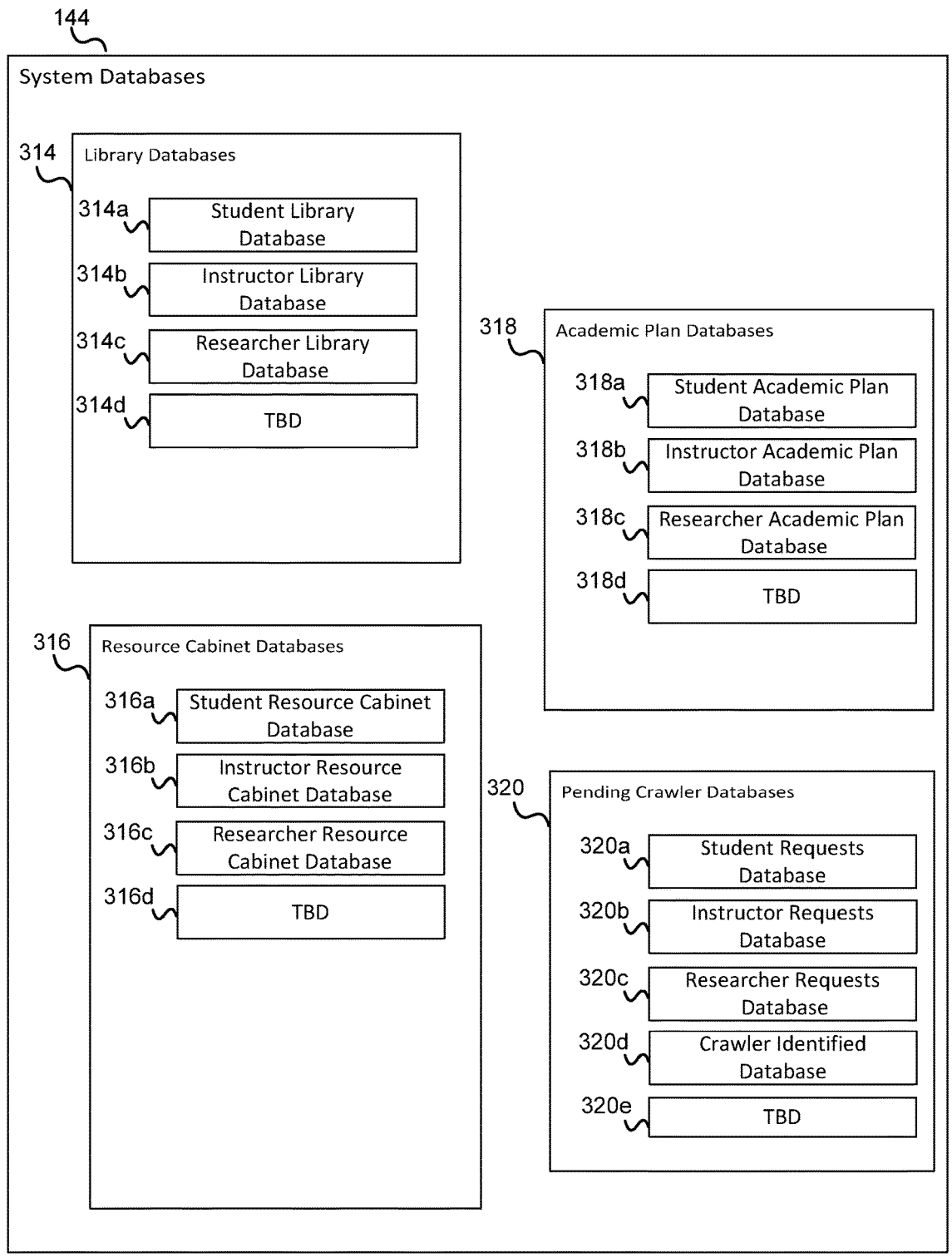
FIG. 3C is a schematic block diagram illustrating embodiments of system databases.
Figure 3D:
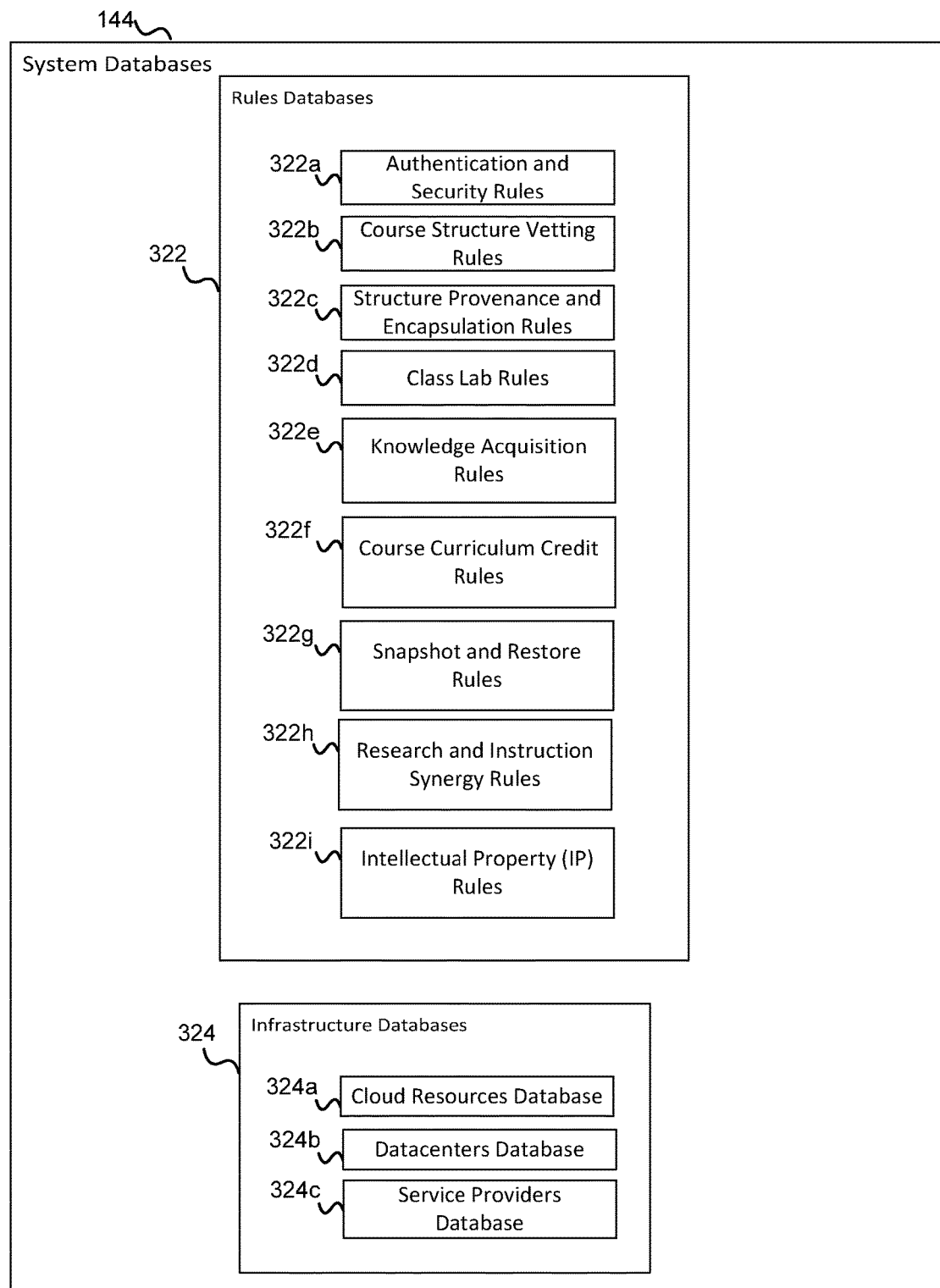
FIG. 3D is a schematic block diagram illustrating embodiments of system database
Figure 3E:
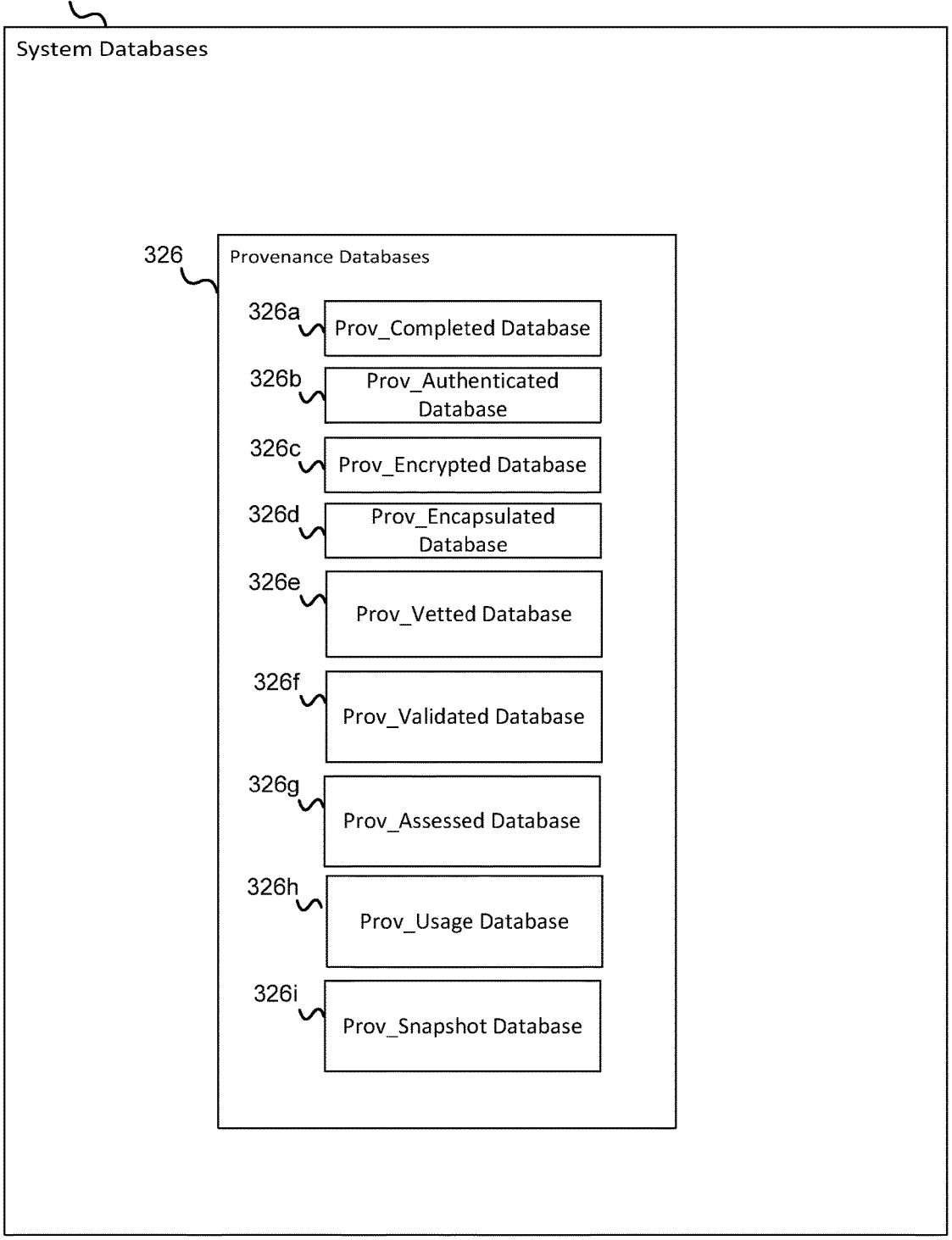
FIG. 3E is a schematic block diagram illustrating embodiments of system databases.

FIG. 3C is a schematic block diagram illustrating embodiments of system databases 144. In one embodiment, the system databases 144 include library databases 314, academic plan databases 318, resource cabinet databases 316, and pending crawler databases 320.

In another embodiment, the library databases 314 include a student library database 314a, an instructor library database 314b, and a researcher library database 314c. In one embodiment, academic plan databases 318 include student academic plan databases 318a, instructor academic plan databases 318b, and researcher academic plan databases 318c. In another embodiment, resource cabinet databases 316 include student resource cabinet databases 316a, instructor resource cabinet databases 316b, and researcher resource cabinet databases 316c. In one embodiment, pending crawler databases 320 include student requests databases 320a, instructor requests databases 320b, researcher requests databases 320c, and crawler identified databases 320d.

In one embodiment, resource cabinet databases 316 include a wide variety of teaching resources, including, but not limited to, slide projector, visual aids, a virtual chalkboard, streaming video, streaming audio, other digital information, text based information, historical information, or the like. In another embodiment, an instructor may supplement a content object with additional resources from a resource cabinet database. For example, an instructor may schedule a special event that may or may not be part of the vetted content object. In this example, an instructor may add resources for the special event to the resource cabinet database. In one embodiment, adding additional resources to a content object may not require the content object, or a course objective, or a curriculum to be vetted.

In another embodiment, a crawler module 148 may automatically identify supplemental material and recommend the supplemental material to be added to a curriculum. For example, a crawler module may recognize sets of material while crawling based on requests from a creature. The crawler module may compare the recognized sets of material with a current curriculum. Based on a difference between the recognize sets of educational material and material included in an educational curriculum, the crawler module may recommend that missing material be included in the curriculum.

In another embodiment, a crawler module 148 may crawl a curriculum from another academic institution and compare that curriculum with the curriculum for the virtual instruction cloud. Based on differences between the curriculums, the crawler module may identify missing material and recommend that the missing material be included in the deficient curriculum.

In another embodiment, a crawler module 148 may generate a set of educational material based on accreditation resources available from third party accreditation institutions, and may automatically recommend educational materials to be included in a deficient curriculum. In another embodiment, a crawler module 148 may utilize various artificial intelligence algorithms to determine material that may be missing from a curriculum. For example, a crawler module 148 may utilize a neural network to measure a completeness of a curriculum, use a genetic algorithm to construct a complete curriculum, or other, or the like. In response to determining a deficient curriculum, a crawler module 148 may recommend that missing material be included in the curriculum for the virtual instruction cloud.

FIG. 3E is a schematic block diagram illustrating embodiments of system databases. In one embodiment, system databases 144 may include provenance databases 326. In another embodiment, provenance databases 326 may include a prov_completed database 326a, a prov_authenticated database 326b, a prov_encrypted database 326c, a prov_encapsulated database 326d, a prov_vetted database 326e, a prov_validated database 326f, a prov_accessed database 326g, a prov_usage database 326h, and a prov_snapshot database 326i.

In one embodiment, a prov_completed database 326a may include a database storing provenance data for portions of a curriculum wherein the provenance has been completed. A prov_authenticated database 326b may include provenance data including authentication information for creatures of the virtual instruction cloud. A prov_encapsulated database 326c may include provenance data for portions of a virtual instruction cloud that includes encapsulated data. A prov_vetted database may include data for a curriculum that has been successful vetted. A prov_validated database 326f may include data for a portion of a virtual instruction cloud that includes validated data.

In another embodiment, a method may include authenticating with the virtual instruction cloud, vetting a course structure, structure provenance and encapsulation rules, generate class rules, generating knowledge acquisition rules, generating course curriculum rules, generating shapshot and restore rules, and generating research and instruction synergy rules.

Figure 4:
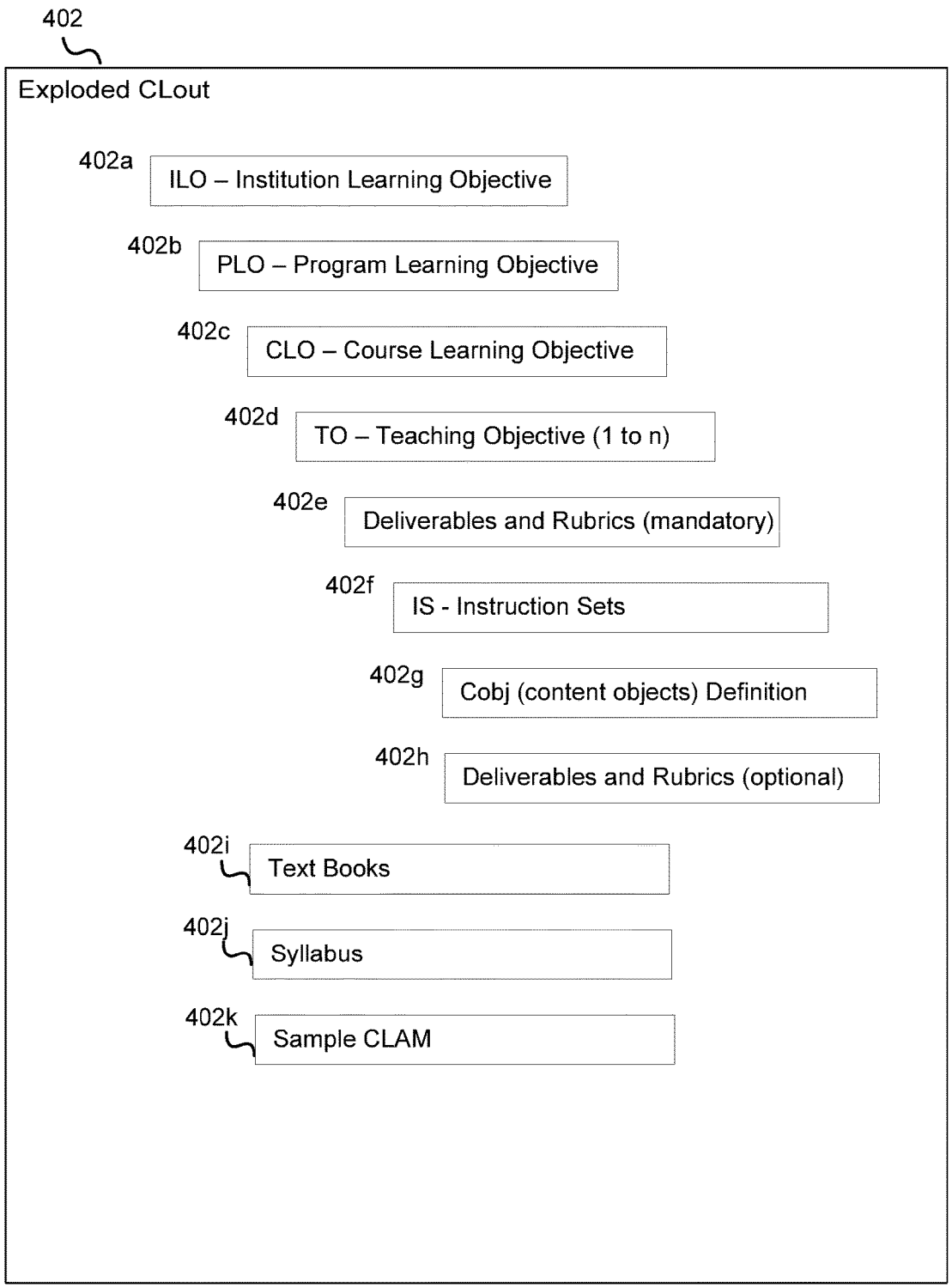
FIG. 4 is a block diagram of the a database record structure.

FIG. 4 is a block diagram of the instruction cloud CLout Database 308a record structure. The CLout Database 308a record structure is the core of the Instruction Cloud system 100. The CLout record structure unified the traditional academic accreditation requirements with the evolving educational resources available via the internet. The traditional accreditation requirements are: ILO—Institution Learning Outcomes 402a, PLO—Program Learning Outcomes 402b, CLO—Course Learning Outcomes 402c. The instruction cloud Clout record structure associates these traditional constructs with the instruction cloud specific objects: TO—Teaching Objectives 402d, mandatory Deliverables and Rubrics 402e, IS—Instruction Sets 402f, Cobj (content objects) 402g and optional Deliverables and Rubrics 402h. The final segment of the CLout record structure completes the unification of old and new requirements via the association of the new objects including the sample CLAM 402k with the traditional text books 402i and Syllabus 402j.

Figure 5:
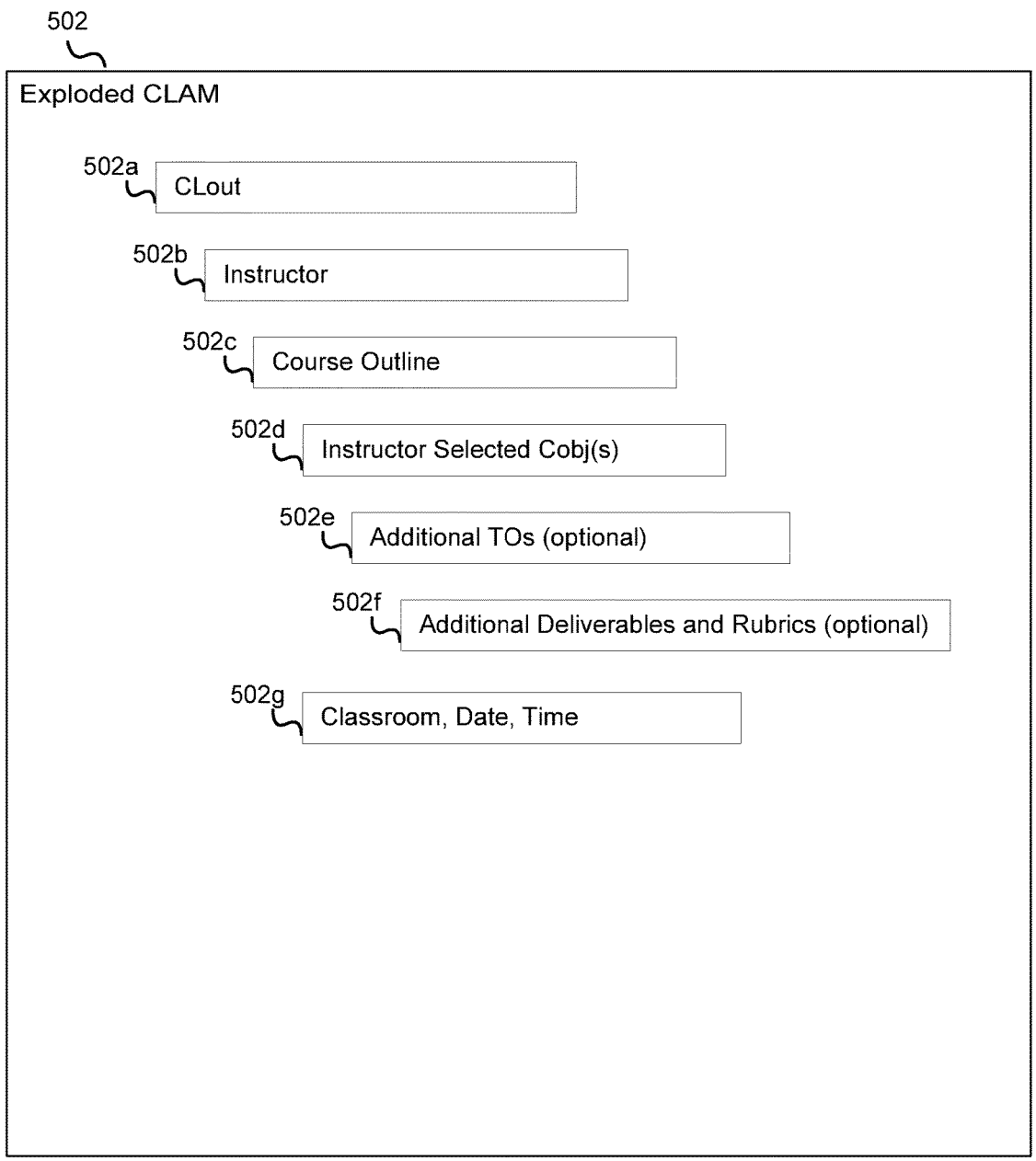
FIG. 5 is a schematic block diagram depicting one embodiment of a CLAM.

FIG. 5 is a schematic block diagram depicting one embodiment of a CLAM. In one embodiment, a CLAM is a live representation of a Clout. The CLAM may be a shell that contains the necessary information for a learning experience to occur. FIG. 5 depicts an exploded CLAM database 308b record that contains actual course content objects, Cobj(s), and other data instead of just the Cobj Definitions 402g contained in a CLout database 308a record. The CLAM instantiates a CLout to a specific instruction class schedule 502g, along with instructor 502b, specific course outline 502c, additional TOs 502e, and deliverables and rubrics 502f.

What is claimed is:

1. A virtual instruction cloud apparatus, wherein the virtual instruction cloud apparatus is implemented by at least one of a VLSI circuit, a gate array, a logic chip, a transistor, a programmable hardware device such as a field programmable gate array, programmable array logic, and a programmable logic device, the virtual instruction cloud apparatus includes:
   a structure provenance and encapsulation engine configured to:
      encapsulate the vetted academic curriculum by analyzing the digital media associated with the vetted academic curriculum to generate a digital hash or a checksum to ensure that the digital media has not been altered,
      create a digital fingerprint or a digital signature of a digital media of a selected academic curriculum to provide assurance that the digital media delivered is consistent with educational content that has been vetted,
      the structure provenance and encapsulation engine further performs at least one of:
         providing proof of completion of deliverables,
         recording the event time of completion,
         tracking a history of teaching objectives and recording an authorship of media content that has been added to any of the teaching objectives,
         tracking a provenance history of the teaching objectives,
         recording an authorship of media content objects, and
         validating the vetting of the content objects by accredited vettors added to any of
      the teaching objectives;
   a class lab module configured to:
      create one or more class by including one or more of a plurality of teaching objectives, and
      create one or more virtual lab, wherein the one or more virtual lab is accessible by both physical machines and virtual machines via a network;
   a course credit curriculum module configured to:
      track a curriculum and associated course credits; and
   a snapshot and restore module configured to:
      store a snapshot of a current configuration of all objects of the at least one class and the at least one or more virtual lab when the user is disconnected with the virtual cloud apparatus; and
      restore the configuration of said all objects of the at least one class and the at least one laboratory exercise when the user reconnects with the virtual cloud apparatus.

2. The apparatus of claim 1, further comprising:
   at least one of a state machine that serves to route process execution from the state of one module to other modules, and
   a crawler module configured to traverse a network in search of educational material to be included in the virtual instruction cloud.

3. The apparatus of claim 2, wherein the crawler module is further configured to traverse a network in response to a request from one of a student, an instructor, and a researcher.

4. The apparatus of claim 2, wherein the structure provenance and encapsulation engine is further configured to:
   process the educational object discovered by the crawler module, and
   place the processed the educational object in a database, wherein the database capable of being accessible by the class lab module.

5. The apparatus of claim 2, wherein the class lab module is configured to use the state machine to structure learning objectives in the virtual instruction cloud.

6. The apparatus of claim 2, wherein the class lab module is configured to use the state machine to structure regulatory compliance and certification objectives in the virtual instruction cloud, and the teaching objectives in the one or more class includes industry certification training.

7. The apparatus of claim 1, further comprising a portal module, the portal module configured to provide a user with read access to a portion of the virtual instruction cloud.

8. The apparatus of claim 1, further comprising a neural interface module, the neural interface module configured to allow a user to physically interface with the virtual instruction cloud.

9. The apparatus of claim 1, wherein the front door module comprises a door key module, wherein the door key module configured to authenticate a user using multifactor authentication.

10. The apparatus of claim 1, further comprising a provenance module configured to perform at least one of:
    tracking the teaching objectives,
    recording a status of the teaching objectives for a student,
    logging a source of new material added to one of the teaching objectives,
    providing assurance that one or more of the teaching objectives is unchanged,
    ensuring inappropriate material is not integrated into one or more of the teaching objectives, and
    maintaining data security by encapsulating one of more of the teaching objectives.

11. The apparatus of claim 10 further configured to track and record courses completed by a student toward the requirements of an academic degree and/or certification including courses from the student's selected academic curriculum, optional outside courses, and self-directed learning experiences completed in any sequence.

12. The apparatus of claim 1, further comprising:
    a vettor module configured to vet an instruction set,
    an infrastructure module configured to import infrastructure information into the virtual instruction cloud, and
    a knowledge acquisition module configured to receive additional knowledge from a user.

13. The apparatus of claim 1 further comprising a research and instruction synergy module that provides an authenticated and secure support for academic-to-academic secure communication with an optional degree of confidentiality.

14. The apparatus of claim 1 further comprising a front door module that provides access to a virtual instruction cloud.

* * * * *